Oct. 5, 1971  M. L. BENDER  3,609,878
TEACHING MACHINES

Filed May 19, 1969  13 Sheets-Sheet 1

INVENTOR.

Martin L. Bender

Oct. 5, 1971     M. L. BENDER     3,609,878

TEACHING MACHINES

Filed May 19, 1969     13 Sheets-Sheet 2

INVENTOR.
Martin L. Bender

Oct. 5, 1971    M. L. BENDER    3,609,878
TEACHING MACHINES
Filed May 19, 1969    13 Sheets-Sheet 4

INVENTOR
MARTIN L. BENDER

BY Cushman, Darby & Cushman
ATTORNEYS

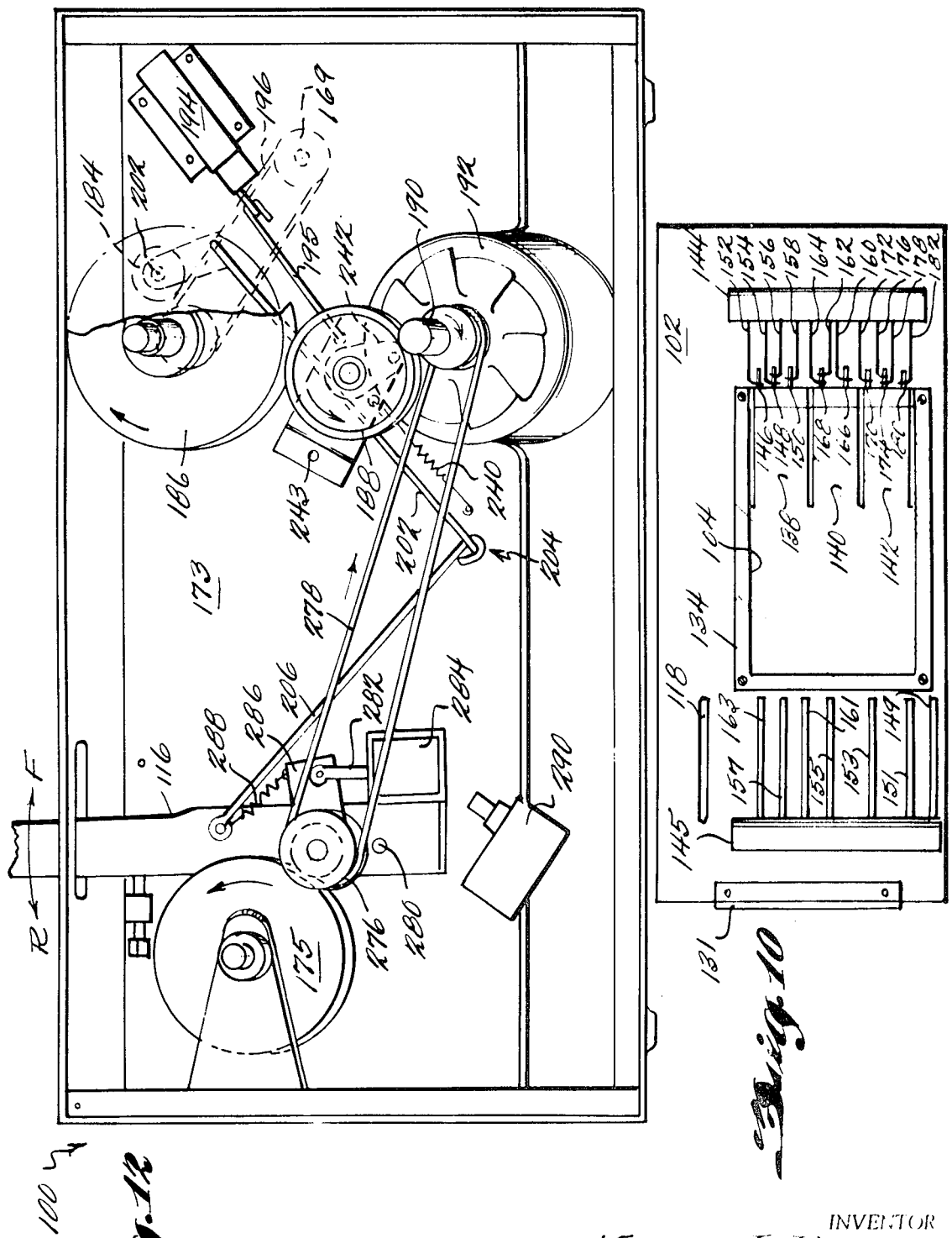

Oct. 5, 1971   M. L. BENDER   3,609,878
TEACHING MACHINES
Filed May 19, 1969   13 Sheets-Sheet 6

INVENTOR
MARTIN L. BENDER
BY
Cushman, Darby & Cushman
ATTORNEYS

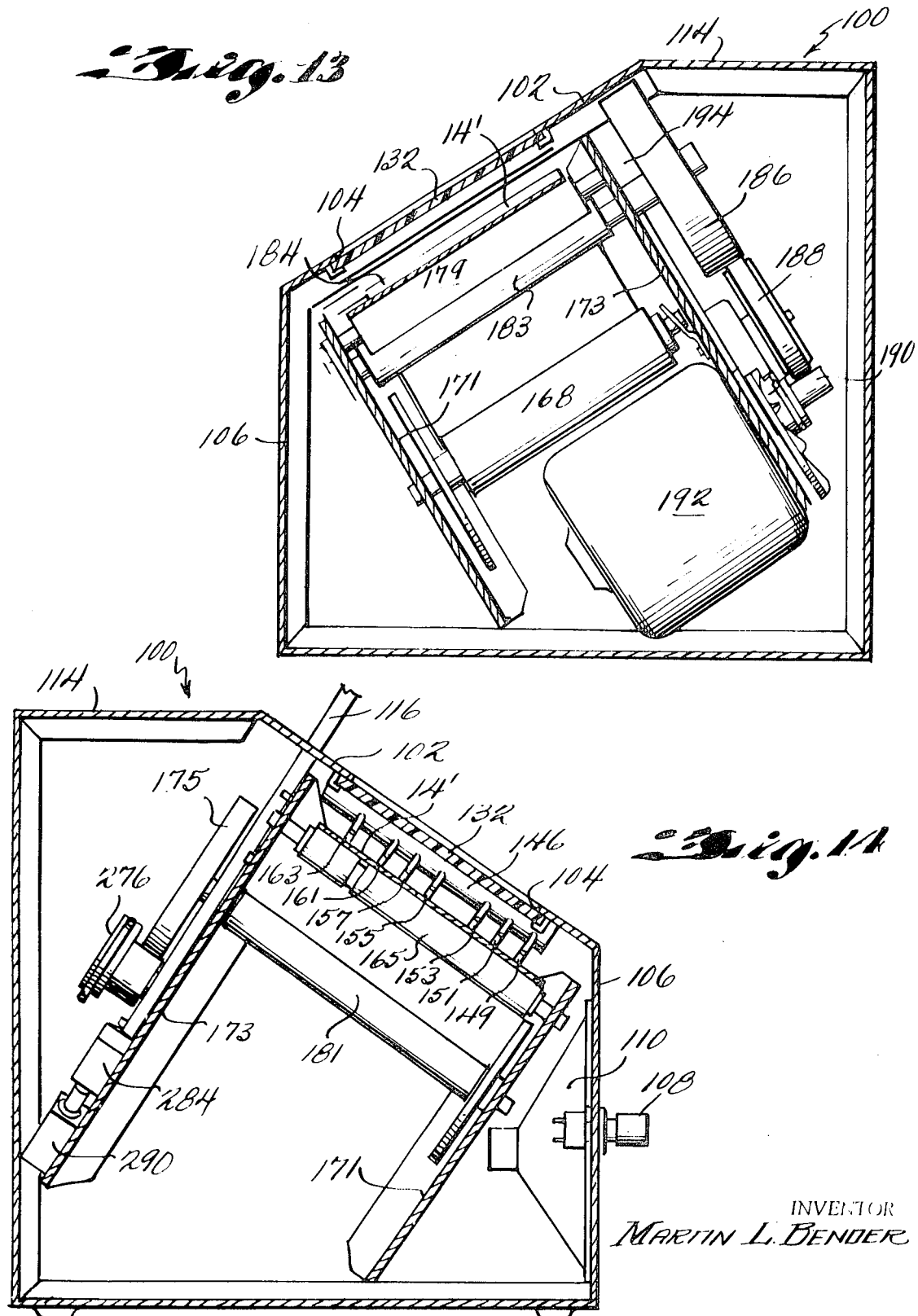

Oct. 5, 1971     M. L. BENDER     3,609,878

TEACHING MACHINES

Filed May 19, 1969     13 Sheets-Sheet 8

INVENTOR
MARTIN L. BENDER

BY Cushman, Darby & Cushman
ATTORNEYS

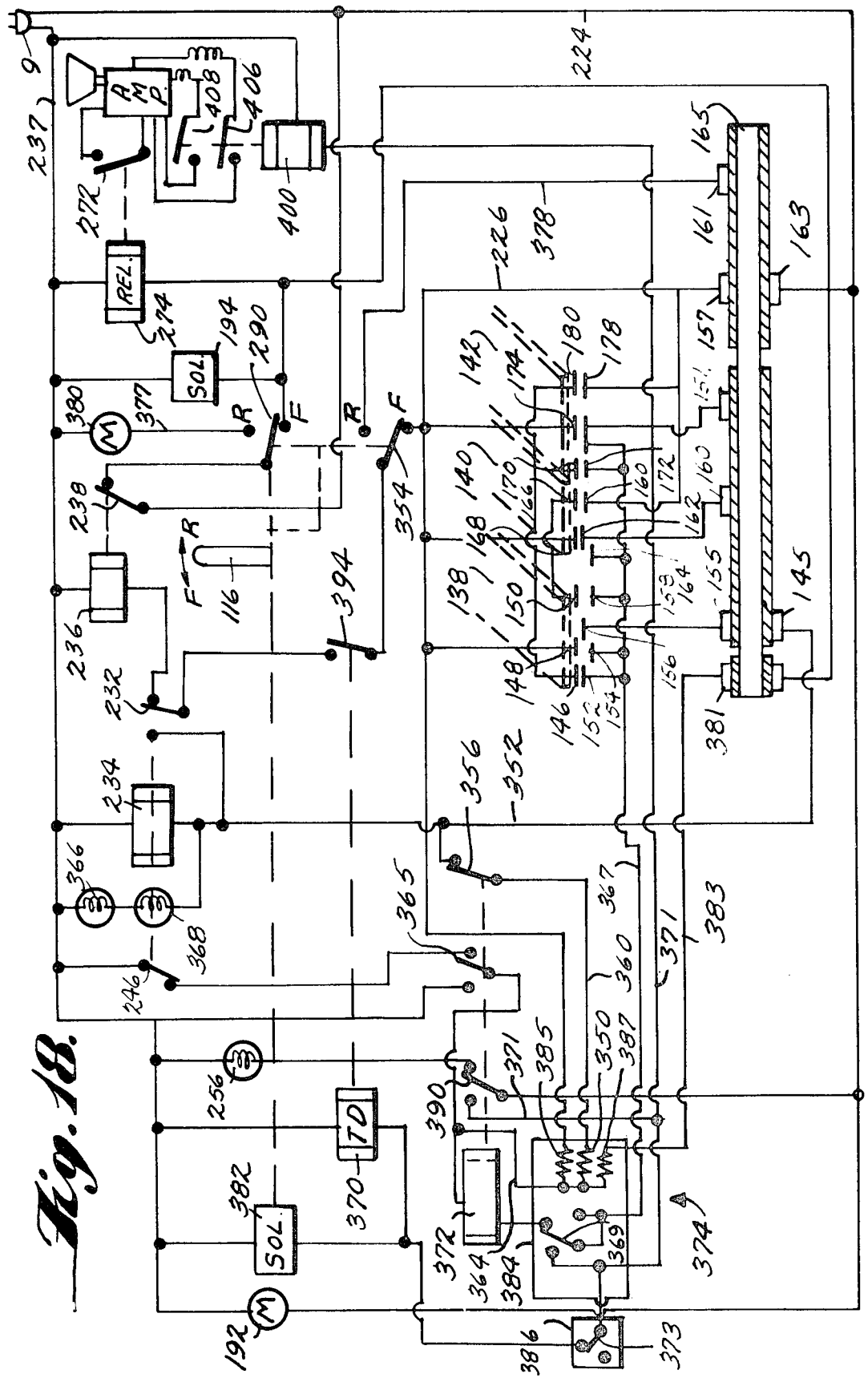

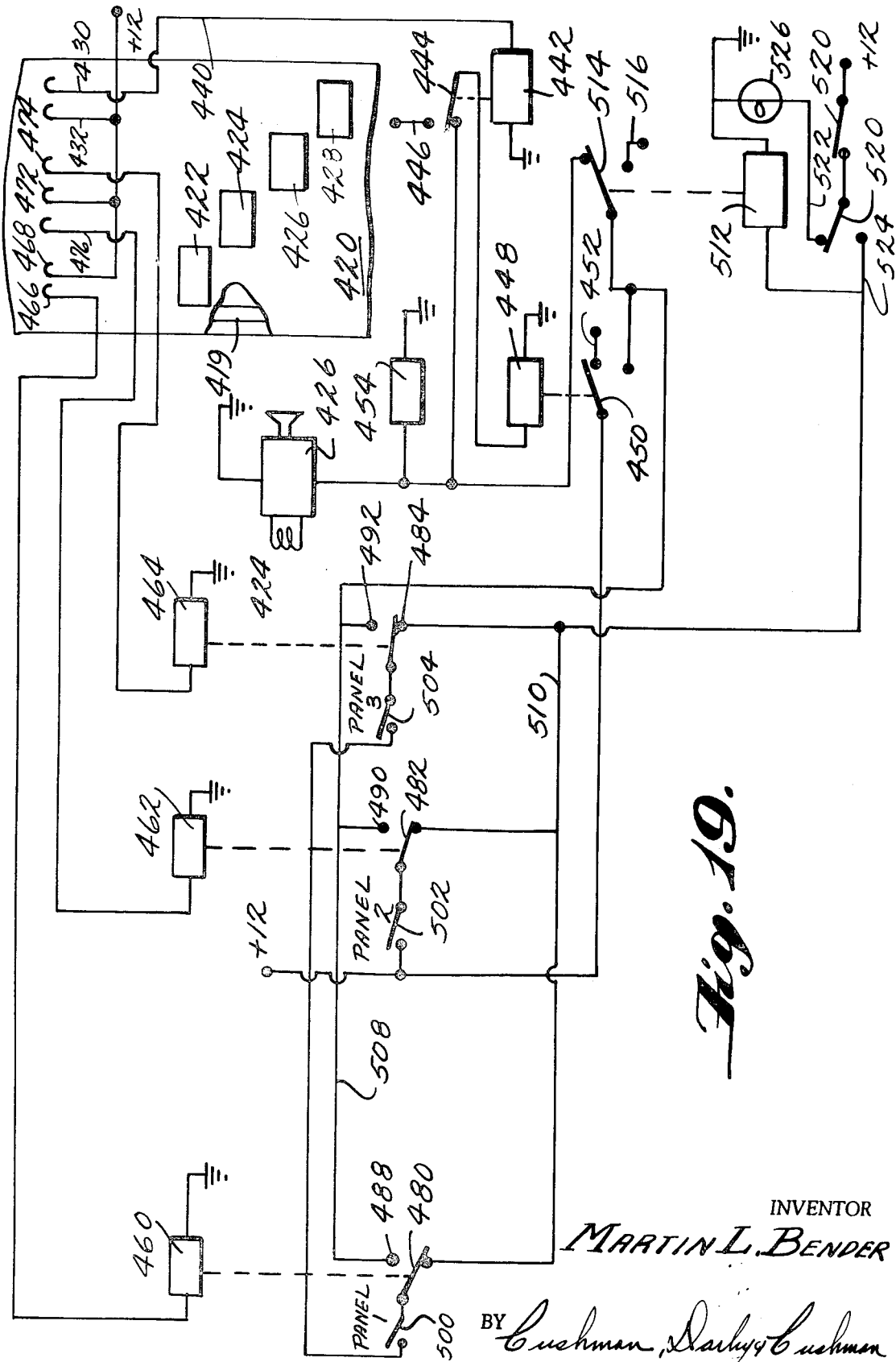

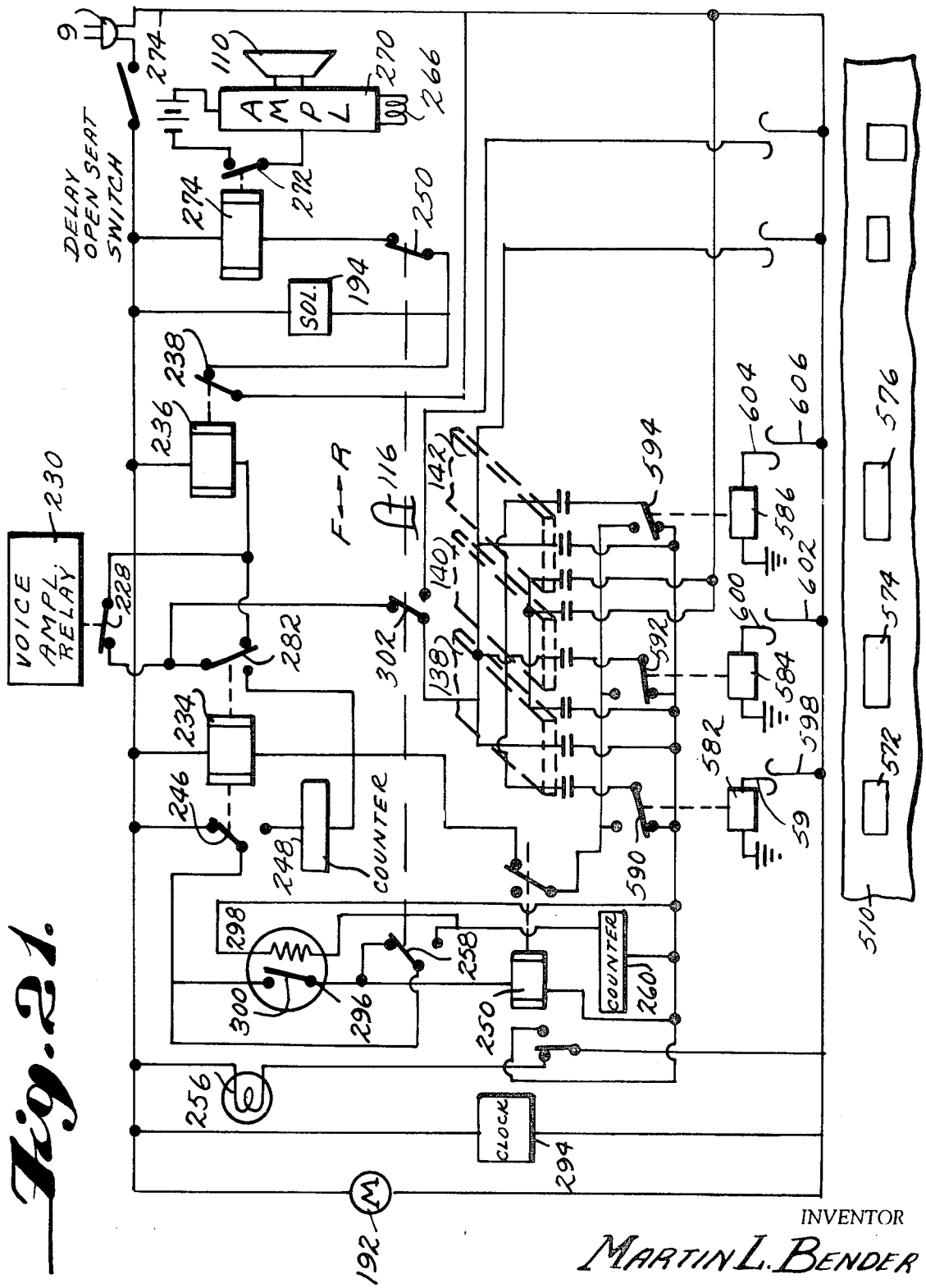

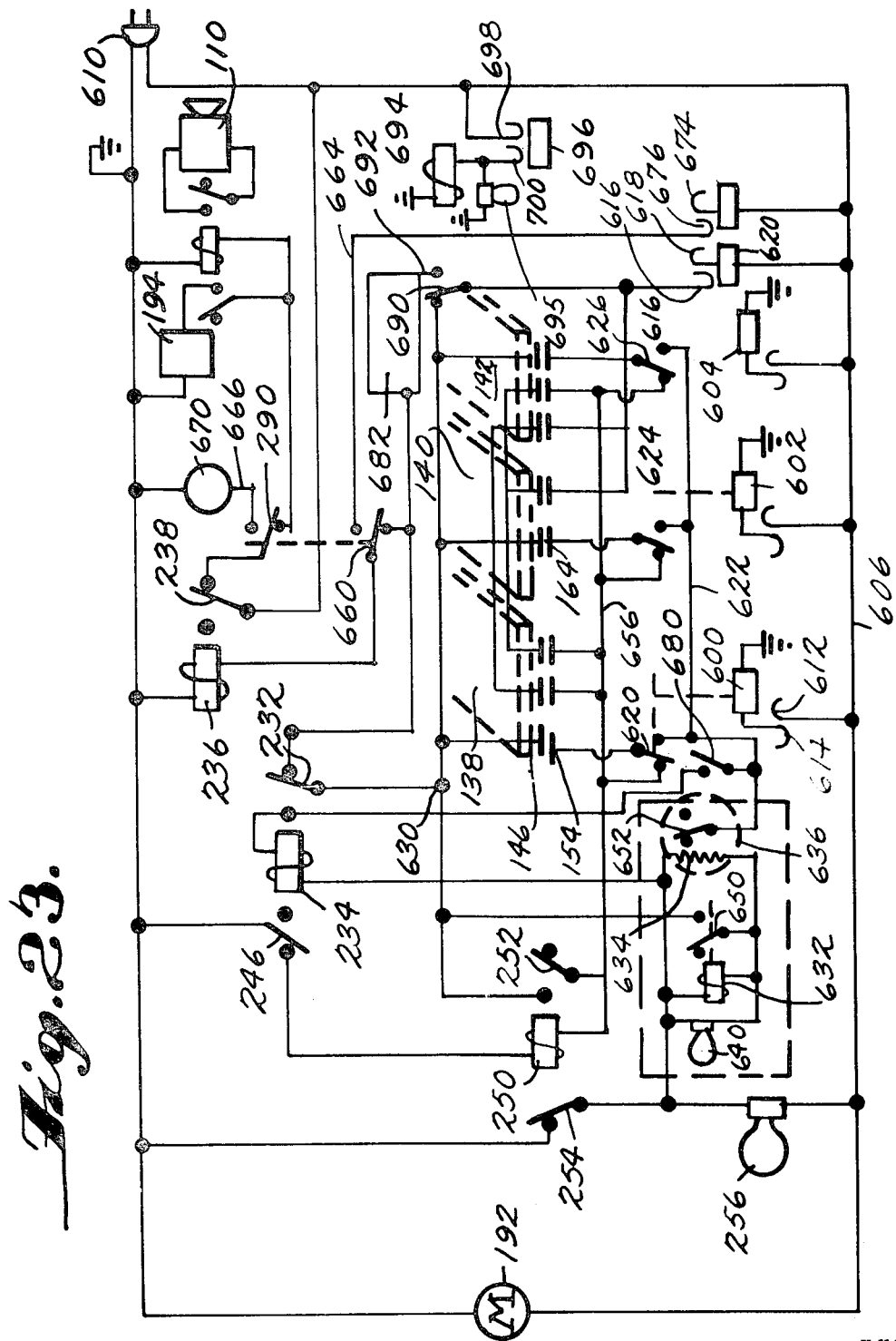

United States Patent Office  3,609,878
Patented Oct. 5, 1971

3,609,878
TEACHING MACHINES
Martin L. Bender, 384 Prospect Ave.,
Hackensack, N.J. 07601
Continuation-in-part of applications Ser. No. 131,515,
Aug. 15, 1961, and Ser. No. 472,071, May 11, 1965.
This application May 19, 1969, Ser. No. 830,573
Int. Cl. G09b 7/06
U.S. Cl. 35—9                                        75 Claims

ABSTRACT OF THE DISCLOSURE

A teaching machine which is automatic and simple in operation and which, in one embodiment, provides a "reward" for a correct response and a "punishment" for an incorrect response. In one embodiment a series of frames on a tape, each comprised of an area posing a question and other areas with a number of answers to that question which can be chosen by the child, are presented sequentially and automatically to the child via a viewing window. The reward may be the automatic movement of the tape to a new position presenting a new question and a plurality of responses and the punishment the pressing of a reset button after each incorrect response. The response to the question can be made by pressing an appropriate button or transparent area or by audibly giving the answer, and either response causing the disclosed control circuit to perform the reward-punishment functions. Audio accompaniment for the tape and a control circuit for causing the tape to automatically present again a question to which the child made the incorrect response either with the same audio track or another audio track, are also disclosed. Other features include methods of using the tape, which has words extending along its length with multiple choices in certain locations, a cartridge tape which does not need to be manually threaded through the machine, a manually operable arrangement for moving the tape backwards and forwards and a switch mounted on the rear to turn the machine on whenever the child sits down.

This application is a continuation-in-part of my copending application Ser. No. 131,515, filed Aug. 15, 1961, now abandoned, and my copending application Ser. No. 472,071 filed May 11, 1965, now abandoned.

This invention relates to teaching machines, and particularly to such machines that are inexpensive but automatic and simple enough to teach young children, of pre-school age, for example, to read.

Recent developments have shown that when a certain, response is made, whether because of intent or inadvertently, the response which is positively reinforced is the more likely, of any number of responses to be repeated. This is true of human subjects or animal subjects. Those responses which are not reinforced or are punished tend to be dropped from the repertoire of responses likely to be made.

Using this principle of reinforcement in combination with Behaviour Primacy theory which says that exploration, curiosity, etc., are primary reinforcers, the machine of this invention embodies the principle that being able to make the machine tape move forward, for example, by depressing little windows with symbols in them, with the optional bonus of causing various lights to come on or go off as a result of such action, will be in itself enough reinforcement to cause the child to seek for what makes the machine operate and thereby eventually learn to read, using, for example, the method of associating the visible words to be learned with either audio representations thereof or of leading words, or visual symbols representing the words to be learned, or both.

Using this principle, I teach children, beginning approximately at age two, to read. Although the attempt to teach such young children to read is not new, it has always required a person to be in constant contact with the particular child or required expensive equipment or both. The most recent success in this area used equipment which was expensive and which required a person to operate the machine while the child played with the machine.

It is therefore the primary object of this invention to provide a machine to teach children to read by a method which is automatic except that at present the machine must be rewound by a person, with a foot or manual operation, for example. This method requires only that the machine be placed in the room where the child is playing. The child will discover in perhaps less than a year how to read, and the total cost of the machine and the entire program is relatively quite low.

The disadvantages of previous teaching machines are that they need to be operated manually in a way which would not allow the very young to operate the machine, or the operation is such that the young could not understand its operation to a point where with suitable programming learning would take place. Also, any such machine would be either too expensive to operate because it requires an extra attending operator, or would be too expensive for the average individual to buy.

The advantages of my machine are, that the machine is automatic in that no person is required to be in attendance while the machine is in operation, except the child himself, in combination with a special process which will teach very young children to read and in combination with simplicity of construction of a type which will bring the cost of the machine within reach of all. This is a combination no other present machine has been able to do. Some have one or two of these advantages but not all three.

The general operation of one embodiment of the machine below described is such that a tape moves forward and stops when it presents to view in a window a set of multiple-choice word answers to a question effectively presented on the tape. The answer words appear at one edge of the window, and each is covered by a transparent selector which when depressed activates a certain mechanism. If the desired or correct answer selector is depressed, a "reward" is given in the form of the machine automatically moving the tape forward to the next answer set. In addition, the "reward" may include the automatic lighting of exterior lamps on top of the machine. These lamps stay on until the new answer set is presented and the tape stops. Then they go off, to come on again when the next correct response is made. If, however, an incorrect response is made by the depression of a selector other than the correct or desired one, the exterior lamps do not come on, the machine does not move the tape forward to the next answer set, the internal dial light which lights up the dial at all times goes off, and the entire mechanism is disconnected from circuit. The only way to bring the dial light back on, which indicates that the machine is ready to operate forward on execution of the correct response, is to operate a resetting means. The purpose of this is to keep the child from merely depressing each selector in turn, finally causing the machine to move the tape forward and not really learning which response is the correct one. The child is mildly punished by having to correct his incorrect responses. This principle is obtained from research which indicates that mild punishment increases speed of learning of correct responses. One roll of paper tape four inches in diameter could contain upwards of several hundred frames, enough to teach a child to read if it is run over often enough and the steps between frames are large enough.

Other features and advantages of this invention will become clear to those skilled in this art upon reading the appended claims and the following detailed description of the invention in conjunction with the drawings, in which:

FIG. 1 is a perspective view of the machine as it may appear from the outside with the cover on;

FIG. 10 is a plan view of the underneath side of the lid of the FIG. 8 machine;

FIG. 11 is a plan view of the FIG. 8 machine with the top and lid removed, looking substantially perpendicular to the normal plane of the lid;

FIG. 12 is a rear elevational view of the FIG. 8 machine with the back side removed;

Figure 9:
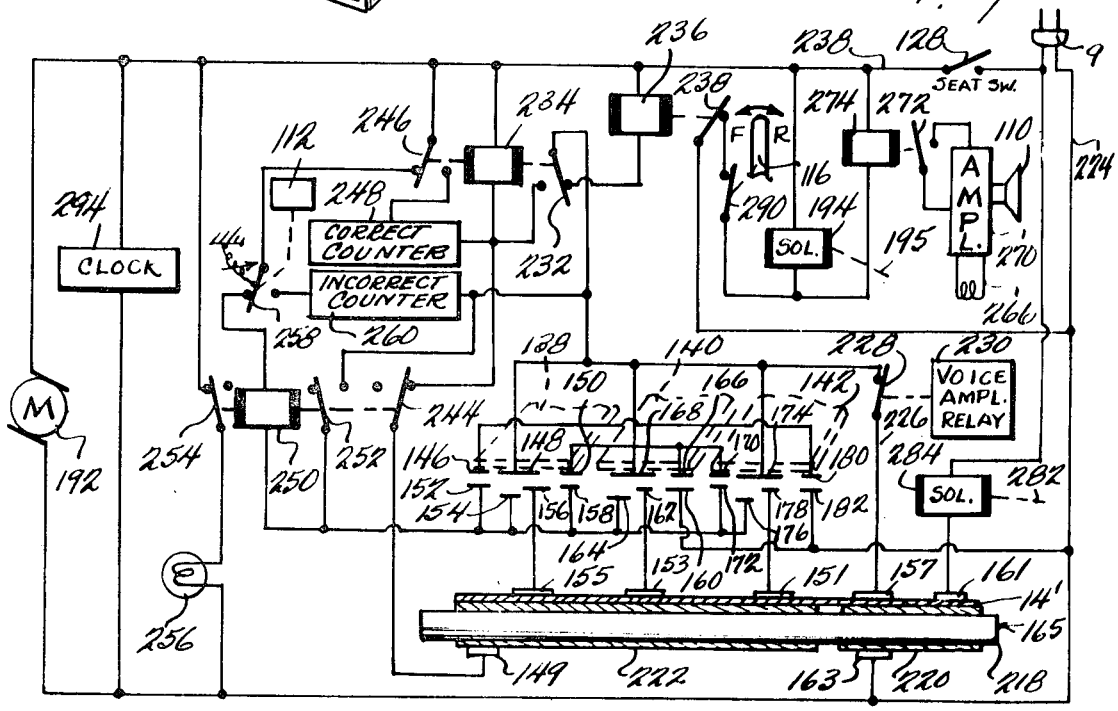
FIG. 9 is a circuit diagram useful in the FIG. 8 embodiment.
Figure 16:
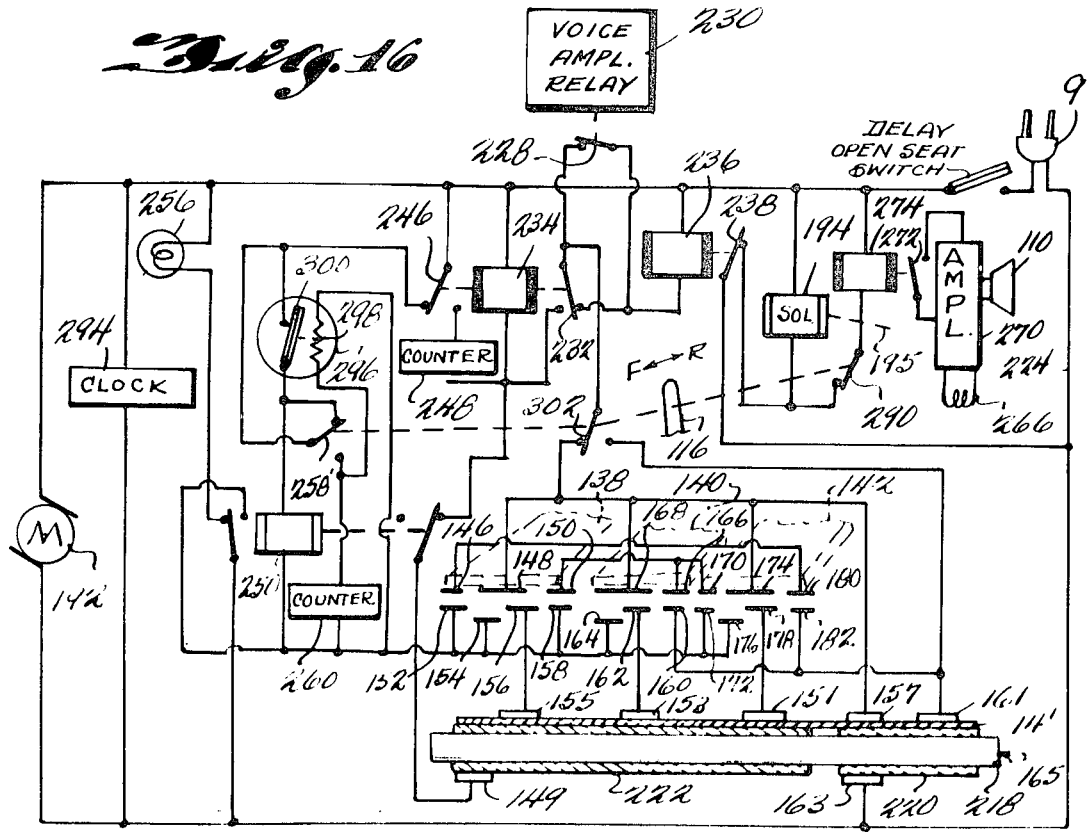
Figure 15:
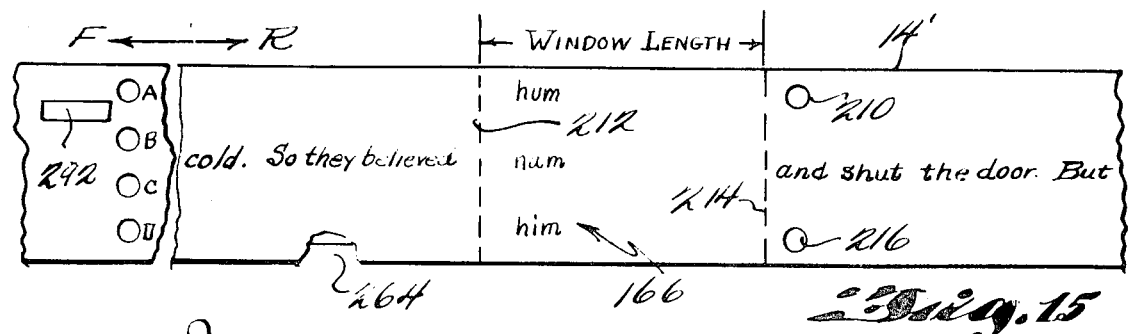
Figure 17:
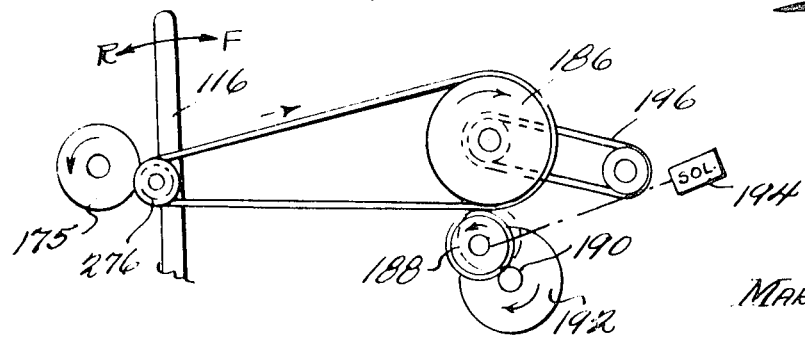
Figure 22:
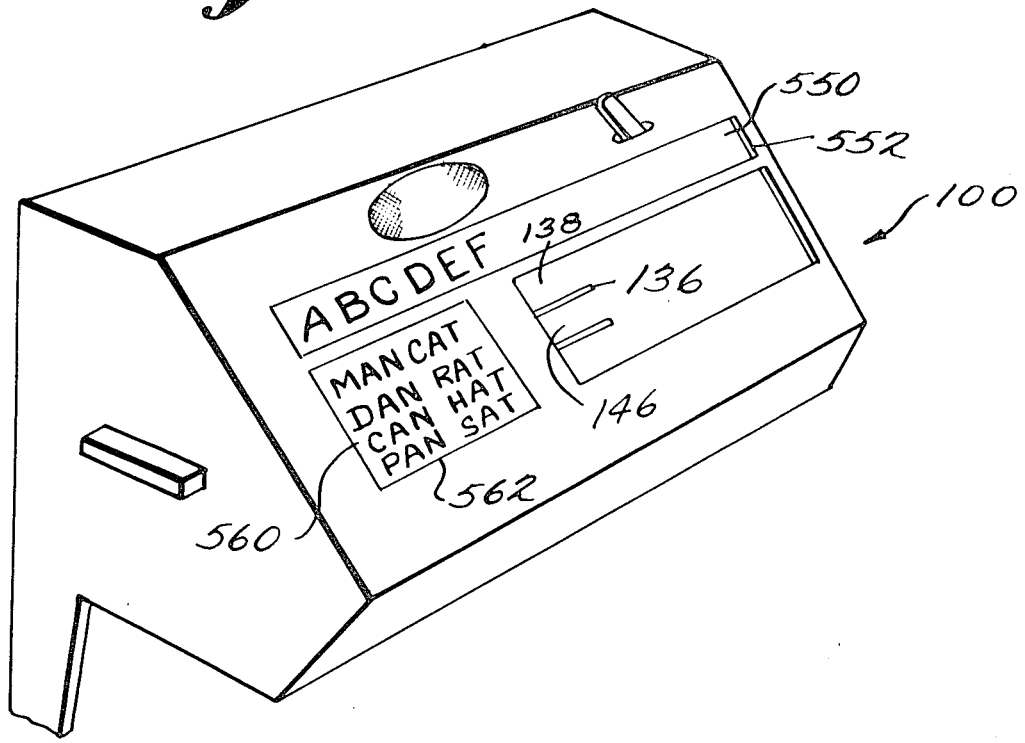
Figure 20:
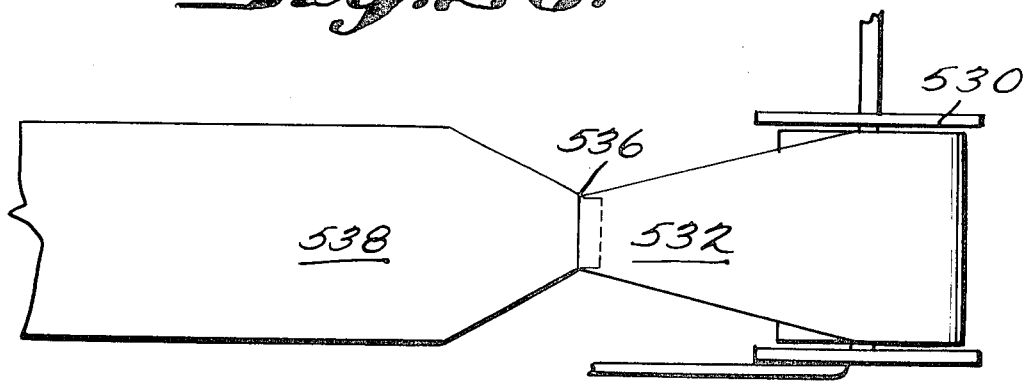

FIGS. 13 and 14 are cross-sectional views of FIG. 11 taken along the lines 13—13 and 14—14, respectively;

FIG. 15 is a plan view of one embodiment of the tape that may be used in the machines of this invention;

FIG. 16 is a circuit diagram illustrating another embodiment and various modifications;

FIG. 17 is a diagrammatic showing of a modified drive system;

FIG. 18 is a circuit diagram of FIG. 9 with modifications thereof;

FIG. 19 is a circuit diagram illustrating another embodiment and various modifications;

FIG. 20 is a view of a cartridge tape;

FIG. 21 is a circuit diagram illustrating yet another embodiment of the invention;

FIG. 22 is a perspective view of the exterior of the machine; and

FIG. 23 shows a circuit diagram of another embodiment of the invention.

I shall now proceed with a detailed description of one embodiment of the machine, having initial reference to FIGS. 1-5.

Figure 2:
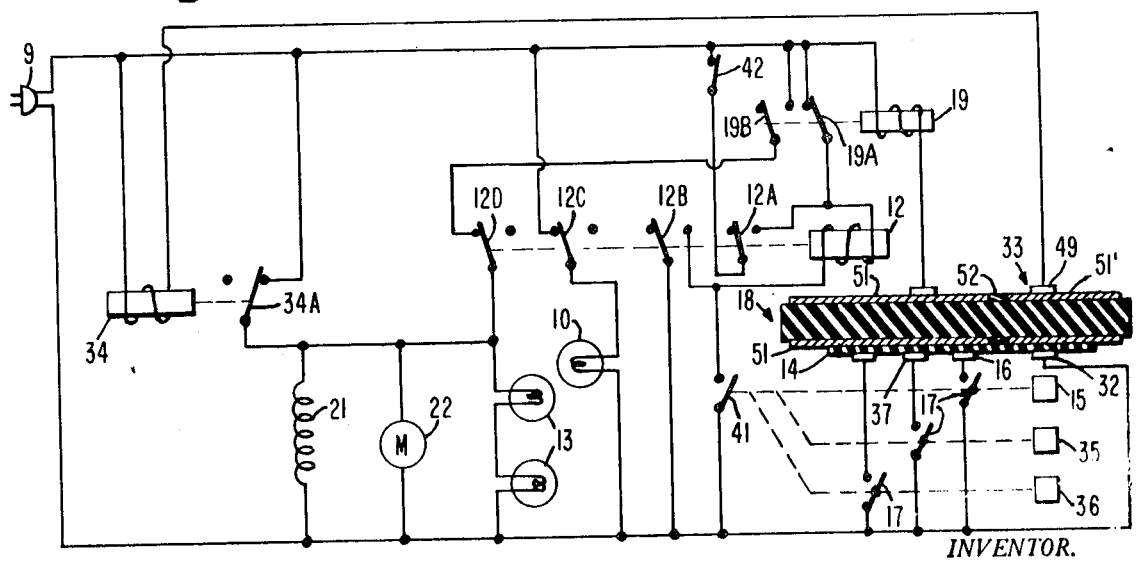
FIG. 2 is an electrical schematic diagram leaving out the tape head, amplifier and speaker since it is an optional variation and since its connections can be deduced from FIG. 7.
Figure 3:
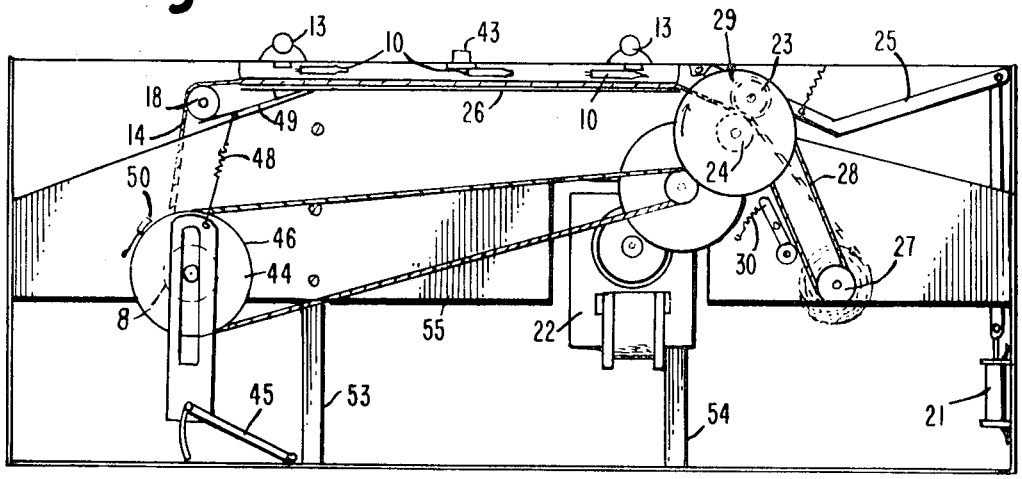
FIG. 3 is a rear elevational view with the cover removed. Notice that only parts which are not immediately obvious are included.
Figure 4:
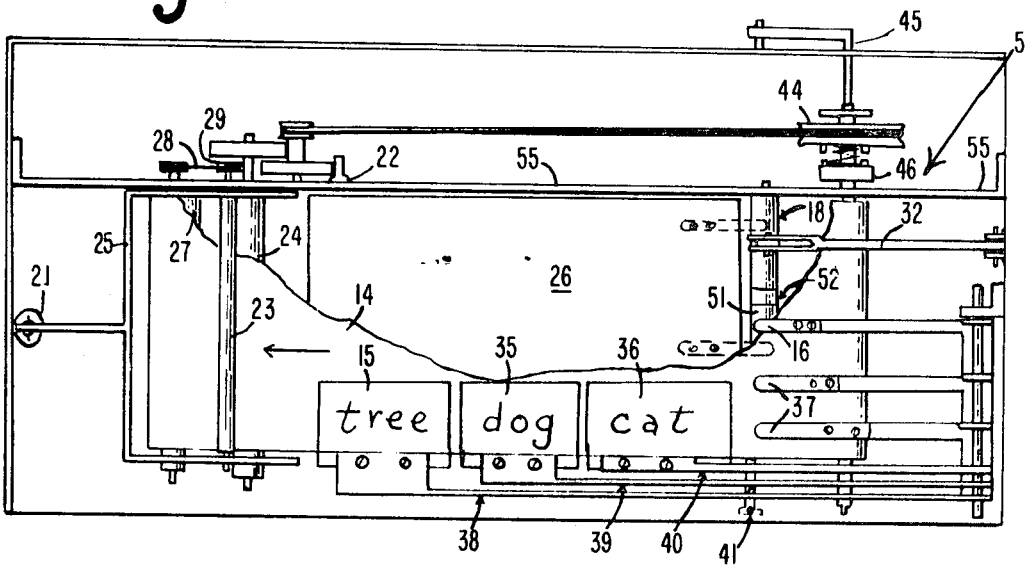
FIG. 4 is a top view with the cover removed and part of the paper torn away to expose underlying parts.

When the machine is plugged into an electrical outlet by plug 9, the dial light 10 comes on, being positioned behind the transparent window 11 and connected electrically as shown in FIG. 2 through normally closed contact 12C of relay 12, which otherwise has contacts 12A and 12B normally open and contact 12D normally closed. This dial light 10 is on all the time when the machine is plugged in except as indicated below. The correct response lights 13 are off and the tape 14 is at rest.

If now the correct response window button is pushed, which in the illustrated case is button 15 since the word "TREE" thereunder on tape 14 designates that picture showing in the instant frame of tape 14, then the associated swtich 17A is closed and completes a circuit through contact point 16 having contact with the circumferentially conductive surface 51 of roller 18 through the hole 20 (FIG. 5) in the tape 14, said roller surface 51 being continuously connected to the coil of relay 19 by a brush contact 51A without tape 14 intervening. When switch 17A is closed, therefore, relay 19 is activated thereby opening the circuit to relay 12 via normally closed contact 19A, and closing the circuit to solenoid 21, motor 22, and lights 13 through normally open contact 19B and normally closed contact 12D, normally closed contact 34A being now open as explained below. I shall now explain the circuit of solenoid 21, motor 22, and lights 13.

The purpose of the solenoid 21 is to pull clutch roller 23 (FIG. 3) against drive roller 24 via clutch lever 25 so that tape 14 is moved forward. The shaft of motor 22 drives an idler wheel 22A a smaller circumferential projection of which, in turn, drives the large wheel 22B that turns roller 24. The tape 14 cannot move forward to the next frame unless solenoid 21 is activated, however, since such is required to move rollers 23 and 24 together for frictionally driving the tape. It will be seen from FIG. 2 that while motor 22 is in operation both solenoid 21 and lights 13 are also in circuit. The two lights 13 are connected in series and are on while the motor 22 is in operation. I have used two 7½ watt, 100 volt bulbs for lights 13 because the filaments when connected in series come on only dimly, making a pretty sight. Any suitable bulbs may be used.

I have just assumed above that the correct response button 15 has been depressed, the solenoid 21, motor 22 and lights 13 are in circuit. Therefore, tape 14 moves forward from supply roll 8 over metal roller 18, over tape table or support 26, between rollers 23 and 24 and winds onto reel or roller 27, which is powered by a belt 28 on pulley 29 (FIGS. 3 and 4) which connectedly extends laterally from roller 23. Pulley 29 is of a size which will cause take-up reel 27 to turn as fast or slightly than roller 23, and belt 28 is loose enough to allow for some slippage, but tight enough to cause tape 14 to be wound with reasonable tightness at all times. The tension of belt 28 is controlled by adjusting spring 30. Tape 14 continues to move forward in the manner just stated until a hole 31 in tape 14 (see FIG. 5) becomes positioned over conductive surface 51' of roller 18 so that conductive wheel contact 32 can make contact through frame indexing hole 31 with roller 18 and contact 49 (FIGS. 2 and 3; this combination of contacts 32 and 49 is also designated switch 33 in FIG. 2). Switch 33 is now closed and from FIG. 2 it will be seen that relay 34 therefore operates to open a normally closed contact 34A to solenoid 21, motor 22, and lights 13. The parallel energizing circuit through relay contacts 12D and 19B which was established when the correct response button was selected, opened as soon as tape 14 started to move thereafter since movement of hole 20 prevented contact between point 16 and roller 18. At the same time, however, tape hole 31 moved so as to release relay 34 and close its contacts 34A, thereby maintaining solenoid 21 and motor 22 operating until the next hole 31 was sensed in the tape. Then, relay 34 was energized as above indicated, causing the opening of relay contact 34A which turns off lights 13, releases solenoid 21 and therefore the pressure of the drive rollers 23 and 24, and brings the tape to a stop so that hole 31 remains positioned between roller 18 and contact 32. To ensure an instant stop of the tape when desired, a pressure brake 50 (FIG. 3) is kept lightly against wheel 46 which is secured to turn with supply roll 8. When the tape stops, switch 33 remains closed as long as hole 31 remains at this spot, i.e., under contact 32. The motor 22 and solenoid 21 will not operate as long as relay 34 is in operation, except when by-passed by a correct response closing switch 17 as indicated above.

Conductive surface 51' of roller 18 is separated from its conductive surface 51 by an insulator 52 but together they form a single roller.

Suppose now that an incorrect response has been made and instead of depressing window button 15, either button 35 or 36 has been depressed, which in this case would be incorrect, and a mechanism would be activated which shall be called an incorrect response mechanism. When the correct response is made, relay 19 is activated because a hole 20 is in the tape at contact 16. But no hole is under either of the contacts 37 and 37', and so the correct mechanism cannot be activated even when their respective switches 17B and 17C are closed by depression of the incorrect window buttons 35 and 36. However, in order for the incorrect mechanism to be activated when incorrect buttons 35 and 36 are depressed, there is placed under button levers 38, 39, 40 (FIG. 4) a switch 41 which is positioned so that when the buttons 15, 35, 36 are depressed the switch 41 is closed. (See FIG. 2.) Each of switches 17A, 17B and 17C have a common pole with switch 41 in effect, in a make before make arrangement, whereby the other contact of switch 41 is so positioned relative to the common pole contact that it is not closed until levers 38, 39 and 40 are just past a point at which the operated one of switches 17A, 17B and 17C is closed when the associateed button is depressed. This is done to keep the incorrect response mechanism from taking over before the correct response relay 19 disengages the incorrect response relay 12 when the correct response button 15 is depressed. In that case switch 41 will not serve to activate relay 12 because contact 19A opens before switch 41 closes. However, if incorrect response buttons 35 or 36 are depressed, switch 41 closes and energizes relay 12 via contact 19A since relay 19 does not operate because of the absence of a hole in tape 14 under brush contact 37 or 37'. Relay 12 is equipped with a circuit, including its contacts 12A and 12B, which, once activated, makes relay 12 self-sustaining. The opening of relay contact 12C then serves to "punish" the operator by turning off dial light 10 which darkens the viewing window 11, and by requiring the operator to perform another act to turn dial light 10 (and the machine) back on, such as opening reset switch 42 momentarily by depressing "punishment" button 43.

The energization of relay 12 by depression of an incorrect response button 35 or 36 also opens relay contact 12D. Since relay 34 is already energized by the closure of switch 33 in the presence of an indexing hole 31 and contact 34A is therefore open, solenoid 21, motor 22 and correct response lights 13 are already deenergized. Consequently, the opening of relay contact 12D does not cause the initial deenergization of these elements, but it does prevent them from being reenergized before the operator depresses the reactivating "punishment" button 43, should the operator push another response button and happened by accident or guess to depress the correct button 15. in other words, depression of the correct response button after an incorrect response button has been depressed, is of no avail in causing the tape to move forward unless the resetting switch 42 is first operated by depression of button 43.

When the series of frames comes to an end at the end of the tape, a series of holes 31 is punched without the accompanying holes 20 and the machine will need to be rewound.

The rewinding of the tape is accomplished by stepping on the exterior foot lever 45 (FIGS. 3 and 4) which will draw biasing element 45' downward and push wheel 44 laterally against wheel 46 in opposition to clutching spring 46' which normally spreads them apart. Movement of element 45' downward also opens switch 33 by pulling on spring 48 which in turn pulls contact 49 away from conductive roller 18, thus opening switch 33, deenergizing relay 34, closing its contact 34A, and causing motor 22 to operate. Motor 22 continuously drives wheel 44 via belt 44' and idler 22A in a reverse direction so when wheel 44 moves against wheel 46 the latter is also driven in a reverse direction to reel tape 14 back onto roll 8.

Table 26 is supported by uprights 53 and 54. On these uprights is placed a cross panel 55 which holds most of the bearings of the shafts and wheels and is a convenient place to fasten anything which needs support during manufacture. Relays are not shown in the drawings (except schematically in FIG. 2) because they may be placed at any convenient place within the housing.

Figure 6:
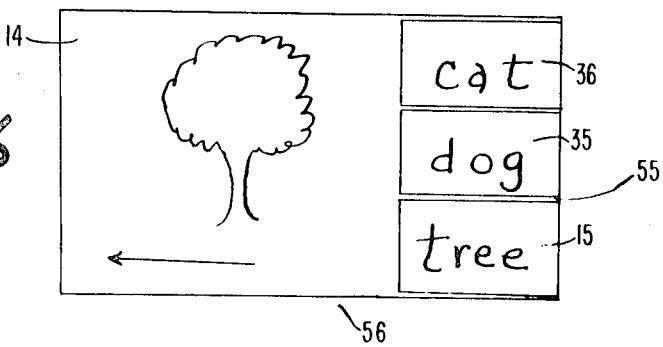
FIG. 6 is a variation with window buttons at side 55 instead of at side 56.

The variation shown in FIG. 6 is accomplished by placing window buttons 15, 35, 36 on side 55' instead of on side 56 of the window and tape frames.

Figure 7:
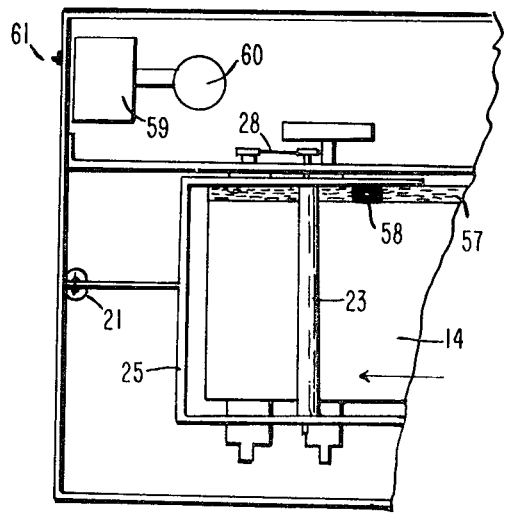
FIG. 7 is a variation with tape sound track included as explained later.

The variation in FIG. 7 is an optional addition which is intended to give verbal support to the operation of this machine. A magnetic tape 57 is attached to the edge of tape 14 so that it becomes a part of tape 14. A playback head 58 is placed on lever 25 in such a position that when pressure roller 23 engages to cause tape 14 to move forward, playback head 58 plays back previously recorded verbal material through an amplifier 59 and speaker 60. This material may have been recorded on tape 57 either by an external source through jack 61 or by a recording amplifier. The recording amplifier incorporated in the machines own amplifier. The recording would, for instance, say "tree" when a picture of a tree came upon the scene.

Another embodiments of the machine of this invention is illustrated with various modification in FIGS. 8–14. As may be noted in FIG. 8, the housing 100 of the machine of the present embodiment is of indifferent shape than the FIG. 1 embodiment. Instead of being fully on top, the face cover or lid 102 of the machine is tilted upward at an angle of about 30° from the horizontal to make it easier for a child to view the area of window 104 of the machine. In the front side 106 is installed a valume control 108 for regulating the amount of sound that emanates from loud speaker 110. The reset button 112 is disposed in the top 114, while the forward-reverse handle 116 extends upward through a slot 118 in lid 102.

Figure 8:
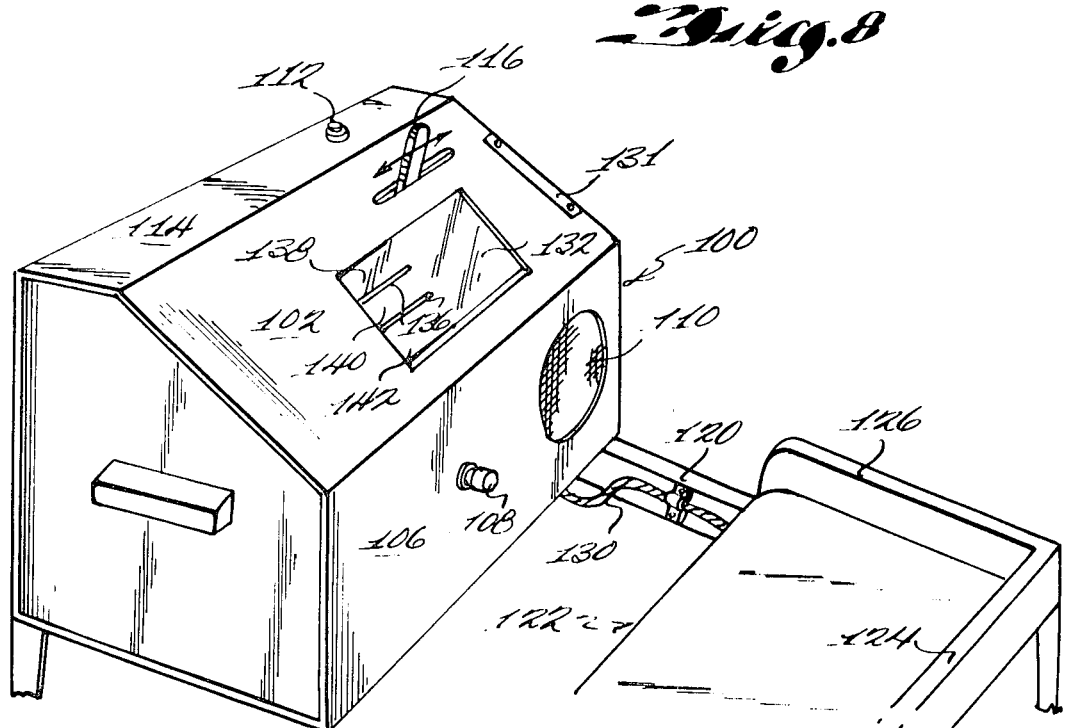
FIG. 8 is a perspective view of another embodiment of this invention with a seat added.

As indicated in FIG. 8, the machine preferably stands on legs and is connected by an element 120 to a seat 122, which preferably has an upstanding rear ridge 124, and a similar side ridge 126 if desired. Seat 122 accommodates a child, and the ridges 124 and 126 tend to keep the child from sitting on the seat unless he is facing machine 100. Associated with the seat is a master electrical switch 128, shown schematically in FIG. 9. This switch is connected by cable 130 in FIG. 8 from seat 122 to machine 100. The switch 128 may either be a floor switch or one which is actually incorporated in the seat itself, but in any event, when a child sits in the seat, the switch closes and automatically turns on the machine. As indicated below relative to a modification of the seat switch, the switch may be of the delay opening type in order to prevent release of the incorrect response mechanism discussed later, by the child merely standing up to open switch 128.

Lid 102 in FIG. 8 is hinged to the housing at its right hand end with a hinge 131. FIG. 10 shows the underneath side of lid 102 with window 104 being covered by a transparent plate 134, which may be plastic, for example. The right hand end of the transparent plate 134 in FIG. 10 is cut to form slits 136. This provides three separate and independently movable arms 138, 140 and 142, which will slightly flex about a line at approximately the end of slits 136. Therefore, these arms, as viewed in FIG. 8, may be slightly depressed upon being pushed inward by a child's finger. These arms are selectors which the child may depress to select his answer, in the same manner as previously described relative to selectors 15, 35 and 36 in FIG. 1. These selectors also act as switch arms or actuators. The electrical wiring for the switches is not shown in FIG. 10, but the switch contacts are. A number of switch pairs are involved, and the stationary contacts extend leftwardly from an insulating terminal board 144 with their left end curving to cross the respective movable switch contact which extends outwardly from the respective switch arm. In particular, switch arm 138 has imbedded in its outward end and extending outwardly therefrom three switch contacts 146, 148 and 150. From terminal board 144 extend four switch contacts 152, 154, 156 and 158. Stationary contact 152 crosses over movable contact 146. Likewise, stationary contacts 156 and 158 respectively cross over movable contacts 148 and 150. These stationary contacts are spaced from their respective movable contacts at a substantially equal distance. The fourth stationary contact 154, however, is spaced further from the common movable contact 148, than the other stationary contacts. The window selector arm 140 operates only three switches, which include stationary contacts 160, 162 and 164, and movable contact 166, which cooperates with stationary contact 160, and movable contact 168, which is common to the other two stationary contacts. Selector arm 142 operates four switches, which respectively are movable contact 170 and stationary contact 172, movable contact 174 and stationary contacts 176 and 178, and movable contact 180 and stationary contact 182. FIG. 9 shows how all of these switches are connected.

At the left end of FIG. 10, an insulating board 145, which is secured to lid 102, holds electrically conductive finger brushes 149, 151, 153, 155, 157, 161, and 163. These finger brushes ride on the electrically conductive roller 165 shown in FIGS. 9 and 11, when lid 102 is closed. FIG. 9 indicates how these brushes are electrically connected in circuit.

Figure 1:
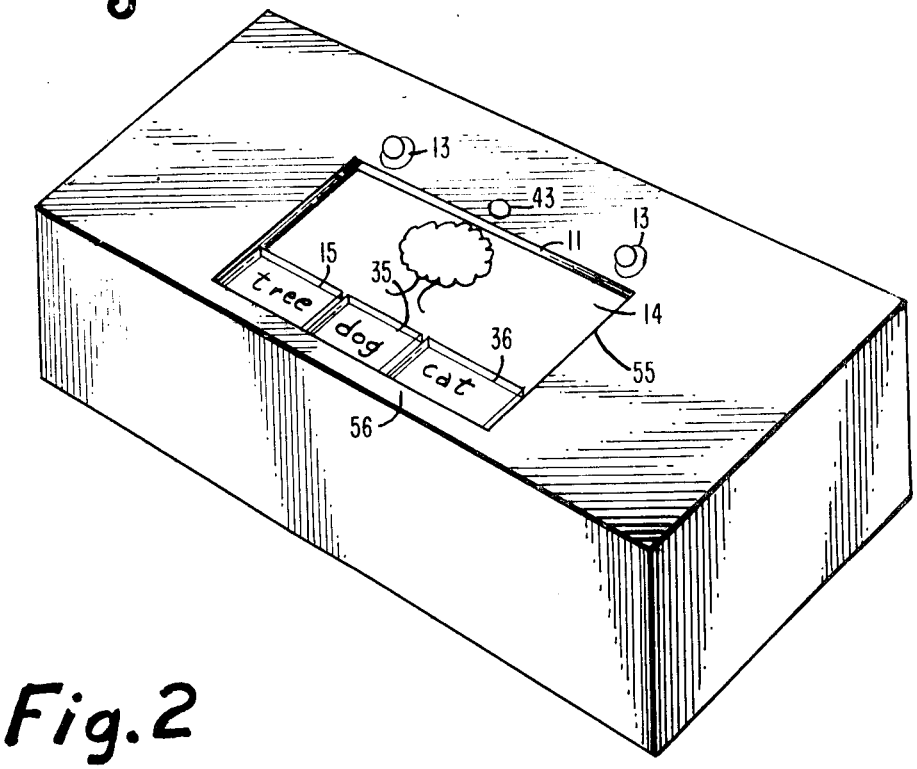
Figure 5:
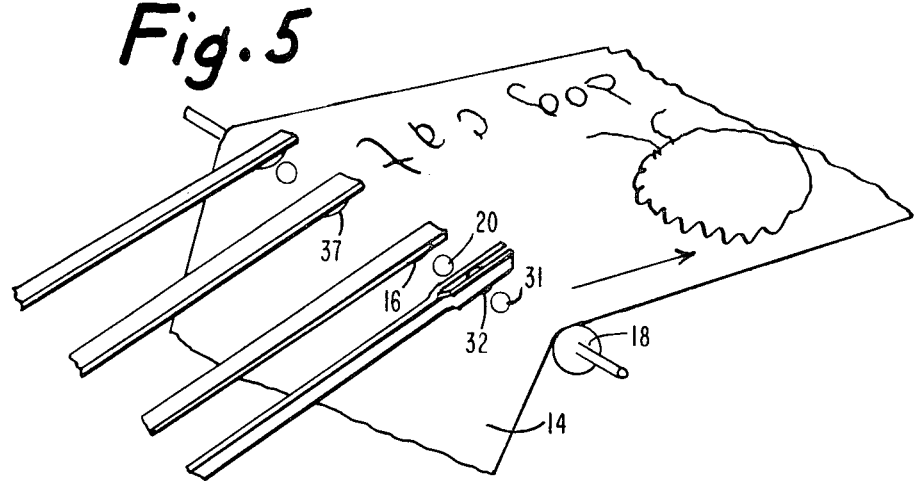
FIG. 5 is an enlarged perspective view of the coding mechanism explained later, looking in the direction of arrow 5 in FIG. 4.

The program for the machine of FIGS. 8–14 may be placed on paper tape in the same manner as shown in FIGS. 1 and 5 or 6, or the program may be of the story type as shown in FIG. 15, where the set 167 of multiple-choice answers, including "hum ham him," provides the answer to the question posed by the word or phrases involved. In any event, tape 14 or 14' is supplied in the machine of FIGS. 8–14 from a supply roll 169 (FIG. 11), which has a shaft that journals in wall member 171 and extends through wall member 173 to a reverse or rewind drive wheel 175. From supply roll 169, tape 14' moves up over conductive roller 165 through tape guides 177, and over idler roller 179 to a take-up reel 181, through a capstan roller 183 and pinch roller 184. Capstan roller 183 is driven by a wheel 186, which FIG. 12 shows driven in turn through an idler wheel 188 which may be rotated by shaft 190 of motor 192, when solenoid 194 pulls idler 188 into contact with both the motor shaft 190 and wheel 186. When wheel 186 turns capstan roller 183, take-up reel 181 is driven thereby through a spring belt 196. The amount of tension on this spring is just sufficient to cause the take-up reel to be driven and to pull the tape from the supply roll 169. Capstan roller 183, in conjunction with pinch roller 184 supplies the main pull of the tape from the supply reel.

Pinch roll 184 is journalled at its opposite ends in brackets 198 and 200, which in turn are secured to a shaft 202. As shown in FIG. 11, this shaft extends through wall 173 and on the external side thereof is bent parallel to wall 173 and terminates in a hooking arrangement 204 with another rod 206 which pivotally connects to the forward-reverse lever 116. When lever 116 is in its forward position, i.e., to the right in FIG. 12, rod 202 is rotated to its furtherest counterclockwise position by the push of rods 206. This tends to push pinch roller 184 against capstan 183, and this tendency is encouraged by the bias of spring 208 (FIG. 11) which is secured to bracket 202. Therefore, tape 14' moves forward, i.e., to the left in FIGS. 8, 11 and 15.

In a manner similar to that described previously relative to the embodiment of FIGS. 1–5, tape 14' of FIG. 15 is marked or coded with an aperture 210 to indicate the occurrence to a set of multiple-choice answers. This aperture is in a particular position across the width of tape 14', for example, in the upper row of four levels of possible apertures. The left end of FIG. 15 shows apertures in each of those four levels A, B, C and D. Aperture 210, like aperture 31, of FIG. 5 is an indexing aperture, and it cooperates with finger brush 157 in FIGS. 9 and 10, to cause the tape to stop moving, with the set of answers 167 so positioned in window 104 that the three answers are respectively under a different one of the window selector arms 138, 140 and 142. The dash lines 212 and 214 in FIG. 15 are not actually shown on the tape, but indicate the relative position of window 104 when tape 14' stops. As to the possible answers in the answer set 167 in FIG. 15 in the context of the sentence there shown, obviously "him" is the correct choice, and this is indicated on the tape itself by the coding as among aperture levels B, C and D of an aperture 216 punched in level D. Had "ham" been correct, an aperture would have been punched in level C. Likewise, if "hum" had been correct, an aperture would have been punched in level B under the indexing aperture 210. The lack of apertures in levels B and C indicates the corresponding words are not correct or desired answers.

The movement of tape 14' into the proper position for indexing the answer set to window 104, causes electrical connection between finger brushes 157 and 163 in FIG. 9. Conductive roller 165 is comprised of a non-conductive shaft 218 and two spaced conductive sleeves 220 and 222. (The space between these sleeves may be filled with a non-conductive material such as 52 in FIG. 2, if desired.) Therefore, when aperture 210 is beneath brush 157, continuity from one side 224 of the AC line is established through brush 163, sleeve 220, and brush 157 to line 226. This line connects through a normally closed contact 228 of a voice amplifier relay 230 if desired, to contact 232 of a correct response relay 234. Contact 232 in turn, in its normal position, connects to relay 236, which connects to the other side 238 of the AC line. Of course, it is assumed that master switch 128 is closed. Therefore, relay 236 is energized and its contact 238 opens. This breaks the circuit from line 224 to solenoid 194. As discussed previously with regard to FIG. 12, this solenoid, through its linkage 195 clutches idler wheel 188. When the solenoid is deenergized, spring 240 pulls idler wheel 188 counterclockwise about pivot point 242 and clockwise about pivot point 243, thereby disengaging idler wheel 188 from the capstan drive wheel 186. Accordingly, tape 14' stops its forward movement from the machine.

If the person operating the machine then selects the correct answer by depressing selector 142 (in keeping with the embodiment shown in FIG. 15), a circuit is established from line 224 through brushes 163 and 157, selector switch 174, 178, brushes 151 and 149, through a normally closed relay contact 244 to the correct response relay 234. This energizes this relay, pulling its contact 232 to the left to effect a holding circuit, and pulling its contact 246 to the right to energize and update the correct response counter 248 by one.

Since the correct response relay contact 232 in moving leftward in FIG. 9 breaks the circuit to relay 236, contact 238 recloses and solenoid 194 is energized again. This pulls idler wheel 188 in FIG. 12 into engagement with both shaft 190 of the running motor 192 and the capstan driving wheel 186, causing the tape to move forward again.

When another indexing aperture occurs in level A of the tape, the tape stops again in the same manner previously described. If this time the person operating the machine elects an incorrect answer by depressing the wrong window selector, say selector 140, then the consequent closure of the correct response contacts 162 and 168 has no effect on the circuit since there is no aperture then under brush 153. The further depression of selector 140, which naturally occurs, closes switch contacts 164 and 168, thereby completing a circuit to the incorrect response relay 250. Such energization of this relay accomplishes several things. One, contact 44 moves leftward, thereby opening the circuit to the coil of the correct response relay 234, and preventing the operator from immediately depressing the correct answer selector so as to cause the tape to move forward. It is one of the main features of this invention that the child cannot select an incorrect answer and them immediately a correct answer to solve his problem. Instead, he needs to release the incorrect relay presently described, before he can cause the tape to move forward again by depressing a correct answer selector. Energization of the incorrect response relay 250 sets up a holding circuit for itself by rightward movement of its contact 252. Rightward movement of its other contact 254 breaks the circuit to dial light 256, which otherwise remains on as long as master switch 128 is closed.

In order to release the incorrect response mechanism which locks the machine in an off condition, the child must, in the present embodiment, depress the reset button 112 in FIGS. 8 and 9. This moves switch arm 258 rightwardly so as to update the incorrect counter 260 by one and simultaneously break the circuit to the incorrect answer relay 250. As diagrammatically indicated by element 262, there is an adjustable amount of pressure required to depress the reset button 112. As will be recalled from the discussion in the above preamble, the reset feature effects a mild type of punishment of the child for selecting an incorrect answer, thereby increasing his desire to select the correct answer. If a particular child is more prone to select incorrect answers than another, the amount of pressure required to actuate switch 258 by button 112 may be increased with the variable pressure element 262. Other types of resetting means are considered later.

FIG. 9 also includes circuitry for implementing the feature of causing the incorrect response relay 250 to be energized if two or more of the selector arms 138, 140, 142 are depressed concurrently. For example, if both selectors 138 and 142 are concurrently depressed, the circuit to relay 250 is completed through the closure of switch contacts 146 and 152 associated with selector 138 and switch contacts 180 and 182 associated with selector 142. If, on the other hand, selectors 138 and 140 are depressed concurrently, then relay 250 is energized through the closing of contacts 150 and 158 by selector 138 and contacts 166 and 160 by selector 140. The further possibility of selector 140 and 142 being closed concurrently is taken care of by concurrent closure of contacts 160, 166 and contacts 170, 172.

Still another feature illustrated in FIG. 9 is the possibility of automatically resetting the tape moving in a forward direction by the opening of relay contact 228 in response to recognition by the voice amplifier relay 230 on a word spoken by the machine operator. Voice relay 230 may be as elementary or as sophisticated as desired with the ultimate embodiment thereof including circuitry that will discriminate between words which the machine operator says, and cause contact 228 to open only if the correct answer word is spoken. The voice recognition art is well developed, as those skilled therein will recognize, and consequently such an embodiment of relay 230 is not only possible but practical in accordance with the present day state of the art. Reference to IEEE Spectrum, beginning a page 114 of the March 1965 issue, and page 45 of the April 1965 issue, may be made for an indication of various sophisticated circuits that may be used with relay 230. On the other hand, the circuitry need be no more elaborate than to sense any voice sound and operate contact 228 if that sound is of sufficient duration.

As shown by the small portion broken away from the edge of tape 14' in FIG. 15, the underneath front edge of the tape includes a strip of magnetic tape 264. Pre-recorded on this magnetic tape 264 are whatever words desired, for example, as for the FIG. 7 magnetic tape. In any event, the audio recordings are sensed by a read-record magnetic head 266 (FIG. 11), onto which the magnetic tape and covering paper tape are appropriately pressed by a pressure pad 268 on the underneath side of arm 268, which extends over wall 171 and is spring biased pivotally to effect the desired pressure. In FIG. 9, magnetic head 266 is connected to an amplifier 270, which in turn operates speaker 110 when relay contact 272 is closed. This normally open contact is closed while relay 274 is energized during the time that the clutch solenoid 194 causes the tape 14', including magnetic tape 264, to advance.

Reversing or rewind lever 115, when moved leftwardly in FIG. 12, causes engagement between idler wheel 276 and the rewind drive wheel 175. Idler 276 is driven by a spring belt 278 connected to the shaft 190 of motor 192. Lever 116 pivots about point 280, and idler 276 is mounted so that downward movement of arm 282 of solenoid 284 pivots bracket 286 against the bias of spring 288 so as to disengage idler 276 from wheel 175 even while lever 116 is being held fully to the left in its tape rewind position. As will be noted in FIG. 9, lever 116 operates switch 290, causing the switch to be closed when lever 116 is in a forward position so that the tape will advance, and causing switch 290 to open when the lever is moved to a tape rewind position. During rewind of the tape, therefore, clutch solenoid 194 is de-energized, and rod 195 therefore releases idler wheel 188 to the disengaging bias of spring 240. Rewind switch 290 also opens the circuit to the amplifier relay 274, thereby preventing audio playback during rewind.

As shown in FIG. 15, the very beginning of tape 14' not only has apertures in each of the four levels A, B, C, D, but also has an elongated aperture 292. When the tape is fully rewound onto take-up reel 180 (FIG. 11), finger brush 161 of FIGS. 9 and 10 senses the presence of aperture 292, thereby energizing solenoid 284 to declutch idler 276 and the rewind wheel 175 in the manner above explained.

Clock 294 in FIG. 9 may be used, if desired, to total the amount of time that a child operates his machine. The clock will run only while seat switch 128 is closed. This clock, as well as counters 248 and 260 are optional equipment, which are generally more useful for research purposes than strictly teaching purposes, though they may be useful for the latter purpose also if desired.

Another embodiment of the machine of this invention, including modifications thereof, is illustrated in FIGS. 16 and 17. Only those changes from the last described embodiment are discussed, all other features being the same. Firstly, it will be noted that seat switch 128' is of the delay-open type. It has been noted that some children, in operating a machine of this invention have discovered that instead of operating the incorrect response relay mechanism, as by depressing the reset button 112 in FIG. 8, can accomplish the same thing by merely standing up so as to cause the seat switch 128 in FIG. 9 to open. This may be considered a desirable mode of "punishment," but if, on the other hand, it is desired that the child actually operate the provided release mechanism, the seat switch can be made to stay closed for a predetermined time after the child stands up. Then, the child is either required to operate the release mechanism, or to stand up a time sufficient to allow the delay-opening switch 128' to open.

The resetting or incorrect response relay releasing means in FIG. 16 is different from that described relative to FIGS. 8–14. In particular, instead of a variable pressure arrangement incorporated in the resetting switch as in FIG. 9, the arrangement in FIG. 16 incorporates a delay in the time required to effect resetting. This delay is embodied in a delay element 296, which includes a heater 298 and a bi-metal switch 300. One way of operating the reset switch 258' is by the forward-reverse lever 116. In this embodiment, therefore, when this lever is moved to the reverse or rewind position, reset switch 258' moves downwardly, causing counter 260 to be updated by one count and connecting heater 298 into the circuit. After a predetermined time, say 30 seconds, and this time can be varied as desired, the bi-metal switch 300 will reopen, thereby breaking the circuit to the incorrect response relay 250. During this delay time, lever 116 has been in the rewind position, so the tape has rewound for that length of time. As soon as relay 250 is de-energized by the opening of the delay switch 300, dial light 256 comes back on, signifying to the child that lever 116 may be moved back to the forward position. Assuming the tape does not stop with an indexing aperture in level A being sensed, movement of lever 116 to the forward position causes the tape to move forward until another indexing aperture in level A on the tape 14′ of FIG. 15 is sensed. This mode of operation has the advantage of causing the child to repeat at least the portion of the tape with which he had trouble, i.e., selected a wrong answer.

The delay element 296 need not be utilized in conjunction with operation of reset switch 258′ by the rewind lever 116, since it may be operated by the reset push button 112 of FIG. 8, without the variable pressure element 262 (FIG. 9) being attached.

As shown in FIG. 17, the rewind driving arrangement for FIG. 16 is different from that in the embodiment in FIG. 12. With lever 116 in the rewind position, capstan driving wheel 186 still is turned since idler 188 remains engaged between motor shaft 190 and capstan drive wheel 186. This is true because in the circuit of FIG. 16 switch 290 does not disconnect clutch solenoid 194. Therefore, when the tape is being rewound, the spring belt 196 must slip because the capstan drive wheel 186 and the supply reel 168, which are connected by the spring belt 196, are turning in opposite directions.

A still further modification embodied in the circuit of FIG. 16 relates to the elimination of the end-of-rewind solenoid 284 of FIG. 9. Brush 160 still senses the elongated aperture 292 at the beginning of the tape in FIG. 15 when rewind of the tape has come to an end and lever 116 is still in its rewind position. Under these conditions, switch 302, which is in its rightward position at this time, completes a circuit to relay 236 thereby opening its contact 238 and de-energizing the clutch solenoid 194. The advantage of this mode of sensing the end of rewind is that it eliminates a solenoid, but by so doing it also eliminates the normal hum that solenoid 284 exhibits when it is energized. Such a hum may be effective to call to the attention of the operator that the rewind is completed. However, any other signaling arrangement for indicating the end of rewind may be used as desired.

The forward-rewind lever 116 may be biased to the forward position if desired so as to require continuous holding of the lever in the rewind position. Alternatively, the lever may have sufficient friction in its movement as to hold itself in either the forward or rewind positions, wherever it is manually moved, without being held there by the operator.

FIG. 16 also illustrates a modification relative to the circuit connection of the voice amplifier 230 and its contact 228. As shown, this contact is in parallel with the correct response relay contact 232. Under these circumstances, an operator must not only depress the correct one of the response selectors 138, 140 or 142, but must also speak appropriately into voice relay 230 so that both relay contacts 232 and 228 are open. Only under those conditions will relay 236 be de-energized so as to reclose its contact 238 and operate clutching solenoid 194 so that the tape will automatically restart movement in a forward direction. Again, the recognition ability of voice relay 230 may be as elementary or sophisticated as desired.

Yet another embodiment of the machine of this invention with additional modifications thereof is illustrated in FIG. 18. Since much of the circuitry is the same as shown in the embodiment of FIG. 9, only specific changes from that embodiment will be discussed in detail. In the embodiment of FIG. 18 as in the embodiment shown in FIG. 9, the paper tape is disposed about the roller 165 so that when an indexing hole passes beneath finger brush 157, the brush 157 is electrically connected to one side of the plug 9 via the conductive roller 165 and the finger brush 163. Also as in the embodiment shown in FIG. 9, the presence of an indexing hole, such as the indexing hole 216 shown in FIG. 15, electrically connecting together the brush 157 and the roller 165 causes the motor 192 to be disengaged from the roller 186 which moves the tape forward and the tape then abruptly and automatically stops.

The electrical connection of finger brush 157 to finger brush 163 via roller 165 causes current to flow through the relay 236 which immediately responds by opening the switch 238, which it controls. The electrical path through relay 236 runs from line 224, through brush 163 and the conductive roller 165, through finger brush 157, down line 226, through switch 354, through normally closed switch 394, through switch 232 and finally through relay 236 and to line 237 which is connected to the other side of the plug 9. The opening of switch 238 then cuts off the electrical flow of power through the solenoid 194 via lines 237 and normally closed switch 290 and, as detailed in connection with the discussion of FIGS. 11 and 12, the deactuation of the solenoid 194 causes the motor 192 to cease moving the tape forward past the viewing window so that the tape halts and a choice of answers to a given question, posed by the portion of the tape within the viewing area, is presented.

The student operator can now choose his answer in the same way that the choice was made in the embodiment of FIG. 9, i.e. by pressing one of the areas 138, 140 or 142 shown in FIG. 8. If the correct choice is made, the relay 234 is activated to cause the relay 236 to become deactuated and allow the power to resume its flow through solenoid 194, by the movement of switch 238 back to the illustrated position. If area 138 is pressed, contacts 148 and 156 are first connected together while if area 140 is pressed contacts 168 and 162 are joined and if area 142 is pressed contacts 174 and 178 are joined. If, for example, area 138 represents the correct answer, then a hole will electrically connect together brush 155 to roller 165. The connection of contacts 148 and 156 then completes an electrical circuit through relay 234. The actuation of solenoid 194 again forces the wheel 188 to drive the roller 186 and consequently the tape is driven forward.

The two lights 366 and 368 which may be disposed beneath the window 132, which is shown, for example, in FIG. 8, are connected in parallel with relay 234 as shown and are lit when a correct answer is given so as to provide a momentary visual reward for the correct answer and to demonstrate to the child quickly and visually that his chosen response was correct. The lamps 366 and 368 can have a holding circuit to cause them to remain lit for a short time after relay 234 is deenergized by the forward tape movement.

A correct answer also connects coil 350 of counter 374 between lines 224 and 237, via brush 163, roller 165, brush 157, line 226, the contacts associated with the correct answer, roller 165, brush 145, line 352, switch 356, line 360, line 364, switch 365 and switch 246. The pulse supplied to coil 350 by this connection resets counter 374 to zero for reasons which will be apparent from the discussion below. After a correct answer is made, the tape will then continue to move as described until another indexing hole connects together finger brushes 157 and 163 to cause actuation of the relay 234 to stop the tape and present the child with another choice of answers to a question.

However, if the response which the child makes to any question is incorrect then the incorrect response causes the machine to reverse the tape and repeat one or more frames as punishment to motivate the child and also to make sure that the lesson is correctly learned. As pointed out above, the contacts which cause the relay 234 to respond to a correct solution are electrically connected together before the contacts of any selector button which causes the relay 372 to respond to an incorrect solution, so that there will be no race between the incorrect circuitry and correct circuitry if a correct solution is given. If arm 138 represents an incorrect choice, then the connecting together of contacts 148 and 156 will have no effect while the connection of contacts 148 and 154 causes the reversal which occurs shortly thereafter.

This embodiment, thus, differs from the embodiment shown in FIG. 9 in that no reset button is provided to be pushed as a penalty. Rather, the choice of an incorrect answer automatically causes the tape to be moved backwards so that the same choice is once again presented to the child and also so that lead in audio material which was presented to the child before his choice, or additional audio material, is played or replayed. In addition, this embodiment has the capability of repeating more than a single frame for an error and also has the capability of playing a second audio track in response to an incorrect error before once again presenting the same problem for the child's consideration.

If the child chooses incorrectly, for example, if arm 138 is pushed when arm 140 should have been pushed, brushes 154 and 148 will connect line 224 to line 367 and current will flow from line 367 to line 237 through switch 369 of counter 374, relay 372 and switches 365 and 246. Relay 372 then responds to the current passing through it by opening normally closed switch 356 and by shifting the switch 390 into contact with the line 371 to create a holding path which causes relay 372 to remain energized until counter 374 shifts switch 369 from the position illustrated.

An incorrect response also causes current to flow from line 391 which is now connected to line 224 by switch 390 through switch 373 of counter 374 and through solenoid 382 and relay 370 to line 237. The solenoid 382 then physically shifts lever 116 to the reverse position which in turn shifts switch 290 into connection with line 377 and switch 354 into connection with line 378. The movement of switch 354 cuts off the current path through relay 236 so that switch 290 returns to its illustrated position, thus deactivating solenoid 194 and completing a current path through reverse motor 380 which then runs the tape in reverse the number of frames recorded on counter 374 as discussed below. Switch 394 is opened by the passage of current through relay 370 and prevents the tape from moving forward until switch 368 opens, deactivating relay 370.

Each frame of the tape presented to the child also contains a coded region indicating the number of frames which are to be repeated if an incorrect answer is given. This code appears on the tape beneath brush 381 for each frame so that an electrical signal designating the number of frames to be reversed upon an incorrect response is passed to coil 387 of counter 374 via line 383.

Counter 374 is comprised of two parts—part 384 which contains switch 369 and coils 350, 387 and 385, and part 386 which contains switch 373. Part 384 in response to the signal from brush 381 passed through coil 387 generates and stores a number which is double the number of frames to be reversed as indicated on the tape while part 386 generates and stores a number equal to that number of frames. As the tape is driven backward by reverse motor 380 after a wrong answer, each time brush 157 is electrically connected to roller 165 by an indexing hole, a pulse is applied to coil 385 of counter 374 to reduce the count stored in both parts 384 and 386 by one. When the number of pulses received by coil 385 is equal to the number originally stored in part 386, then switch 373 is opened to deenergize solenoid 382, causing lever 116 to return to its normal forward position and thus shifting switches 290 and 354 back to their illustrated positions.

Counter 374 may be of the count down type so that each pulse applied to coil 385 subtracts one from the numbers stored in parts 384 and 386. Switch 373 then opens when the stored number in part 386 reaches zero and switch 369 likewise shifts from the illustrated position when the count in part 384, which is double the number of frames to be repeated, equals zero.

After switch 373 is shifted, cutting off the current through solenoid 382, the tape is now driven again in the forward direction as current resumes flowing through solenoid 194 which then operates motor 192. During this forward movement an alternate sound track is played to give further information or instructions to the child. Relay 400 is energized by the shifting of switch 390 by relay 372 into contact with line 391, and energized relay 400 then opens switch 406 cutting off the reading head which picks up the normal track and closes switch 408 energizing the reading head which picks up the alternate track.

After switch 373 opens, the tape then moves forward while the alternate tape is played. Since switch 390 remains in contact with line 371, the lamp 256 remains unlit until relay 372 is deenergized which occurs after the tape has returned to the original frame at which the incorrect answer was given. Because relay 370 delays for a short time in reclosing switch 394 after switch 373 is opened, the detection of the indexing hole which caused switch 368 to open does not stop the tape. Each indexing hole encountered thereafter by brush 157, however, causes relay 236 to be actuated to stop the tape and present a choice of answers as well as to apply a pulse to coil 385 to reduce the count in part 384 by one. Switch 356 prevents the counter from being reset during this repetition of previous frames.

If the child responds correctly, then the tape is moved forward to the next frame while still playing the alternate track but if an incorrect response is made, the tape is reversed further in accordance with the code detected by brush 381. Open switch 356 prevents counter 374 from being reset after each correct answer. The frame for which the wrong answer was given originally will eventually be presented again to the child. Switch 369 will then shift from the position illustrated, cutting off the current to relay 372 since the total number of pulses received by coil 385 is equal to the number stored in part 384. This will normally occur when the original frame is once again presented. Relay 372 is then deactivated, shifting switches 365 and 390 back to their illustrated positions and also deactivating relay 400. Further, a correct answer now passes a pulse to coil 350 via switch 356 resetting the switches 368 and 369 to their illustrated positions. The tape then moves ahead in the normal manner, presenting the next frame for consideration.

Reference is now made to FIG. 19 which shows yet another embodiment of a control circuit for performing some of the functions detailed in connection with the discussion of FIG. 9. However, in this embodiment, areas containing conductive ink or other conductive material are used instead of actual holes through the paper tape. These conductive areas can be disposed on the back of the tape so that they are invisible to the child or unobtrusively placed on the front of the tape if convenient. In FIG. 19, a tape 420 is shown with four areas 422, 424, 426 and 428 of conductive material such as conductive ink or the like. The areas 422, 424 and 426 serve the same function as the hole 210 shown in FIG. 15 and the area 428 serves as the indexing means in the same way as hole 216. Of course, for any given choice of answers only one of the areas 422, 424 and 426 would be present but all three are shown in FIG. 20 so that the overlap of areas 424 and 426 can be readily observed.

In this embodiment, the tape 420 moves forward displaying the pictures or words on the tape in the same manner as described above for the other embodiments, and a magnetic tape 419 which is mounted underneath the tape 420, as shown is read by a convention magnetic head 424 causing an audio signal to be produced by the amplifier 426. Similarly, two or more magnetic tracks on tape 419 can be employed in the manner described in FIG. 18.

The motion of the tape 420 is stopped by the electrical connection of the brushes 430 and 432 by the conductive indexing area 428. These brushes 430 and 432 continuously ride against the paper tape 420 but the resistance of the paper is ordinarily sufficient to prevent substantial flow of current between the brushes 430 and 432. However, when the conductive area 428 connects the brushes 430 and 432 together, the source of 12 volts is effectively connected to the line 440 thereby actuating the relay 442 as current flows through it from the 12-volt source to ground. It will, of course, be understood that the 12-volt source and the ground representation shown in FIG. 19 could also be adopted for the embodiments shown in the FIGS. 9, 16 and 18, and the plug representation shown in those embodiments could be used with FIG. 19.

The actuation of relay 442 causes the switch 444 to shift from the position shown into connection with contact 446, thus, cutting off current through relay 448 and allowing the switch 450, which relay 448 controls, to shift to the position shown, i.e. connected to contact 452. The movement of switch 450 in turn breaks the current path through solenoid 454 which functions in the same manner as solenoid 192 described above to keep the tape 420 moving forward. Thus, the solenoid 454 is deactuated and forward movement of the tape ceases, to present the child with a choice of answers which to respond to in the same manner as described above.

At the same time that the area 428 connects together the contacts 432 and 430 one of the areas 422, 424 or 426 also connects together two contacts to cause one of the relays 460, 462 or 464 to be actuated. If the correct answer is associated with the area 422 then that area is present and the contacts 466 and 468 are connected together by that conductive area and a current path is completed through the relay 460 from the 12-volt source to ground. If the correct answer is associated with the area 424, then the contacts 470 and 472 are connected and a conductive path is completed throguh the relay 462 between the 12-volt source and ground. Similarly, if the area 426 is associated with the correct answer, then the contacts 474 and 472 are connected together and an electrical path is made through the relay 464 between the 12-volt source and ground. Note that the single contact 472 serves to connect to both the contacts 470 and 474. Thus, it is necessary that the areas 424 and 426 have an area of overlap as shown. Since there ordinarily will be no situation in which both the areas 424 and 426 will be present this overlap can cause no problem.

Thus, when the tape 420 is stopped by the electrical connection of the contacts 432 and 430 by the area 428, the one of the relays 460, 462 and 464 which is associated with the correct answer is actuated to cause movement of one of the switches 480, 482 and 484, respectively, to the contacts 488, 490 and 492, respectively. When the child manifests his choice of answer by pressing one of the areas or selectors which may be of the type shown in FIG. 8, this action in turn causes a switch below that selector to be closed. For example, if the panel 1 which is associated with the area 422 is pushed then the switch 500 is closed. If the second panel which is associated with the area 424 is pushed then the switch 502 is closed, and if the third panel which is associated with the area 426 is pushed then the switch 504 is closed.

If the correct answer is selected then the 12-volts are connected to line 508 which in turn allows current to pass through the solenoid 454 to ground to cause the tape 420 to once again move forward until the next indexing area 428 connects together the contacts 430 and 432 to present another choice to the student.

However, if the switch 500, 502 or 504 which is pushed corresponds to an incorrect solution then the 12-volt potential is connected instead to the line 510 which causes actuation of the incorrect response relay 512. The actuation of the relay 512 in turn shifts the switch 514 from the position shown into connection with the contact 516 thus preventing actuation of the solenoid 454 if the correct answer is subsequently chosen. Similarly, actuation of the relay 512 moves the switch 520 from contact with the line 522 into contact with the line 524. The movement of switch 520 cuts off the flow of current through the light 526 and thus causes the light 526, which illuminates the window, to darken. Similarly, the connection of the switch 520 to the line 524 completes an alternate path through the relay 512 so that the relay remains actuated after the incorrect switch 500, 502 or 504 is released.

Thus, the relay 512 keeps the switch 514 connected to the contact 516 until the reset switch 528, which may be of the type described in detail above in connection with the discussion of FIG. 9, is manually operated to break the connection of the 12-volt source to the relay 512 and, to allow the child to once again choose among the possible answers. Suitable rewind means such as discussed in detail in connection with FIG. 18 may be also included if desired.

Reference now is made to FIG. 21 which shows the embodiment of FIG. 16 modified to operate with a tape having suitably disposed areas of conductive ink in place of holes. In the embodiment of FIG. 21 the tape 570, as the tape 420 of FIG. 19, has discrete areas of conductive ink. In FIG. 21, one of the areas 572, 574 or 576 identifies the correct answer while the areas 578 and 580 correctly locate the questions and answers. As in the embodiment of FIG. 19 one of the relays 582, 584 or 586 is energized to shift the position of switch 590, 592 or 594, respectively, when the area 572, 574 or 576 connects together contacts 596 and 598, contacts 600 and 602 or contacts 604 and 606, respectively. The subsequent pressing of the correct arm 138, 140 or 142 then permits the presentation of a new question as discussed above while the pressing of a wrong lever causes a punishment to be exacted. Since the operation of the embodiment of FIG. 21 is substantially the same as the embodiment of FIG. 16, no detailed description of that operation is deemed necessary here.

Reference is now made to FIG. 20 which shows a cartridge tape which can be employed with this teaching machine. This cartridge simply comprises a spool 530 upon which is wound the paper tape 532 with the apertures or conductive areas such as described above. To keep the spool 530 from coming unwound, when out of the teaching machine, the last few inches of the tape 532 can be made of a stiff plastic with a curl set which then acts as a spring to give the tape 532 wound. To load the machine tape 532 can then be simply dropped into a cartridge area whereupon the hook 536 is grabbed by the take-up leader 538 and the tape 532 is automatically pulled forward until the first indexing aperture or conductive area causes the motion to stop and present the child with a choice as discussed above.

In FIG. 22 is shown yet another embodiment in which a set of relevant items, such as the tabulation of the words and alphabet to be used in conjunction with the programs of the machine, is slipped into a slot or plastic case which surrounds one side of the viewing window under which the relevant materials are slid. These programs may or may not be referred to by the program and present the child with a prospective of the material which he is absorbing and serves as an anchoring model to which he can relate and to which he can anchor the individual items which he is learning. In FIG. 22, a card 550 is slid into an envelope 552 having a transparent front cover so that the card 550 displaying the alphabet can be easily observed by the child. The card 550 can be easily replaced by another card if and when desired. Similarly, a card 560 displaying a number of words which presumably relate to the tape being played is disposed in another envelope 562.

In FIG. 23 another embodiment of the invention which also uses a tape having conductive areas in place of holes is illustrated. As in the embodiment of FIG. 19 one of the relays 600, 602 or 604 is connected to line 606, which is in turn connected to one side of plug 610, whenever the tape stops to present the student with a choice of answers. This connection is accomplished by a region of conductive ink on the tape which electrically joins together the two brushes associated with each relay. Thus if relay 600 were associated with the correct response, current would flow through relay 600 from line 606, through brushes 612 and 614, and relay 600 to ground, while relays 602 and 604 would remain inactivated.

The forward moving tape is stopped whenever brushes 616 and 618 are connected together by a region 620, which serves the same purpose as the indexing hole detected by brush 157. Region 620 completes a path through relay 236 opening switch 238 and cutting off the flow of current to solenoid 194 so that the tape stops for the child's selection.

The child then makes his choice by depressing one of the panels as in the other embodiments above. If the choice is correct, a reward lamp is lit and after a short pause the tape moves forward to present the next frame. If the choice is incorrect, the child must reverse the tape as a punishment before being permitted to choose again.

If relay 600 is energized after the tape is stopped by a conductive region connecting together brushes 612 and 614, then switch 620 is immediately shifted into contact with line 622. Switches 624 and 626 are likewise controlled by relays 602 and 604. If panel 138 is now depressed, then line 630 is connected to line 622 via contacts 146 and 154 and switch 620. Current now flows from line 606 to ground via relay 632, resister element 634 of heater relay 636, reward lamp 640 and switch 254. Relay 632 responds to the current passing through it by closing switch 650, bypassing the line 622 and the panel contacts so that lamp 640 remains lit and relays 632 and 636 remain activated until the tape moves forward breaking the electrical connection between line 606 and line 630.

After a short reward period during which the machine pauses with lamp 640 lit, heater relay 636 closes switch 652 thereby completing a current path through relay 234 which responds to the current now flowing through it by opening switch 246 and shifting the position of switch 232 so that current ceases flowing through relay 236. Switch 238 then returns to its illustrated position with the result that the tape is once again moved forward. Relay 234, 632 and 236 are deactivated as line 630 is disconnected from line 606 by the movement of region 620. Likewise, the relay 600, 602 or 604 which was activated is deactivated and switches 620, 624 and 626 remain in their illustrated positions until the tape is once again stopped to present the child with a new choice.

If an incorrect choice is made then line 656 is connected to line 630 instead of line 622. For example, if panel 140 was pressed when panel 138 should have been pressed, then current flows from line 630 through contacts 150 and 164, switch 624, line 656, relay 250 and switch 246 to ground. The passage of current through relay 250 closes switch 252 so that current continues to flow through relay 250 via switch 252 after the panel which was pressed is released. Also relay 250 opens switch 254, extinguishing lamp 256 and preventing a subsequent correct choice from being effective.

The child must now reverse the tape in order to earn a new choice of answers. This reversal is accomplished by manually moving a lever or other device so that ganged switches 660 and 290 are shifted from the position illustrated into connection with the lines 664 and 666, respectively. Switch 290 now completes a current path through reverse motor 670 while interrupting the path through solenoid 194 so that the tape is moved backwards. Relay 250 is thereafter deactivated as region 620 moves from beneath brushes 616 and 618.

The tape then moves backward, with the conductive regions appearing beneath brushes 616 and 618 being ineffective in stopping the tape because of the shifted position of switch 660 until the lever controlling switches 290 and 660 is released or until a conductive region links brushes 674 and 676, thus completing a current path through relay 236 to open switch 238 and cut off the current flowing through reverse motor 670. The region linking brushes 674 and 676 is preferably located at the beginning of the tape to stop the tape after it has been completely rewound and thus prevent any possible damage to the machine. After the ganged switches 660 and 662 are automatically or manually returned to their illustrated forward positions, the tape again moves forward with amplifier 110 repeating the lead in message to the child in the normal manner until a region 620 links brushes 618 and 616.

A switch 680 is also provided in parallel with switch 650 and relay 632 to permit operation without pause if desired. Further, a voice relay 682 is included which can respond to the student's oral responses as well as his choice of answers. In the same manner as described in connection with FIG. 16, when switch 690 is shifted into connection with line 692, then the child must instead of depressing the correct panel orally respond correctly to open a switch within voice relay 682 and deactivate relay 234. Switch 692 is shifted when relay 694 is activated because a conductive tape region 696 connects together brushes 700 and 698. A lamp 695 is connected in parallel with relay 694 to indicate when an oral response is required. Thus if such a region appears, the machine responds to oral responses while if it does not a panel depression is necessary instead. Relay 694 thus provides for automatic switching from panel only to oral only operation. If desired, additional conductive regions on the tape and an additional relay can be added to provide for operation in a third state wherein both oral and panel responses are required.

Another way of encouraging children to say words, which has proved quite successful, is to have the audio recording on the magnetic tape correlated with the words and phases that successively appear in the window of the machine, but with some of the visible words not recorded on the magnetic tape. In such an arrangement, the visible words that are not recorded on the magnetic tape, have a characteristic different from the other visible words that are recorded on the magnetic tape. For example, the recorded words may be printed in red ink on the paper tape, while the words that are not recorded may be printed thereon in black ink. As the child hears the red ink words announced, he sees a black ink word coming into a particular position in the window where he knows that the tape will stop (for example, because of an indexing aperture such as 210 in FIG. 15), and that the speaker 110 will not announce the black ink word. This encourages him to try to pronounce it himself. As a sample of this mode of operation, consider the following sentence:

"An old man lived on a hill with his black cat." This sentence would be printed in full on the paper tape, with the underlined words being characterized differently from those not underlined, for example, the underlined ones would be printed in black ink and the others in red ink, or the underlined and non-underlined characteristics may be employed. On the sound track, the words "man" and "cat" would not appear, but hopefully would be voiced by the child as the question of what the word is occurs to him. It is not absolutely necessary to stop the tape with this "word dropping" mode of operation, but tape stopping may be accomplished, if desired, by the indexing apertures previously discussed. When stopping is employed, then either the window selectors 138, 140 and 142 may be employed to cause the tape to advance again, or this may alternatively be accomplished by a voice recognition relay 230 which is connected into the circuit in either of the manners illustrated in FIGS. 9 and 16.

In all of the embodiments which employ magnetic tape for audio purposes, there must be relative motion between the magnetic tape and the magnetic head. This may be accomplished by movement of the magnetic tape, with the head being secured in a stationary position as described relative to FIGS. 7 and 11. Under such circumstances, and in cases where a word that appears in an answer set is to be spoken by the speaker 110, such may be done either before the tape stops or after it restarts. In this manner, the child may hear the word in question immediately before, or if desired, immediately after he makes a correct response. Announcing the word after a correct response appears to be psychologically better. Alternatively, the word may be announced both before and after a correct response.

Another manner of obtaining relative motion between the sound track and playback head is to move the head after the tape stops. This mode of operation is suitable to an embodiment in which the visible and audio programs are recorded on a tape of the microfilm type. While the playback head could be moved just the length of one frame on the microfilm, an alternative way of operating to obtain a greater recording distance per visible frame is to employ separate sound tracks which are parallel to each other and diagonal to the length of the microfilm, for example, at a 30° angle, so that the total length of each sound track may be several frames long, for example, three. In such a situation, the playback head would move in a diagonal path for the length of three frames while the microfilm tape is stopped, and the head would return to the starting point. Then when the microfilm moves to the next frame, a new diagonal sound track, which corresponds to that frame, is positioned under the path of the movable playback head. Once the sound track has been recorded with the diagonal track mode, it cannot be played back in a continuous manner. However, the support apparatus for the playback head may be movable by a position lever so as to read or record audio information in a path parallel to the length of the microfilm. The two separate types of sound recording may be employed side by side on the same microfilm and the equipment arranged so that when the film is moving forward the playback head automatically lines up with the parallel track to play it back, but when the film stops, the head turns to a diagonal position and proceeds to play back the diagonal tracks while the tape is stopped. Other paths besides diagonal ones for the audio playback head may be employed, for example, circular or zigzag paths, which will provide a greater audio path length than the length of a given film frame.

With regard to an embodiment that uses tape requiring the matching of printed words to a printed symbol, such as the tapes in FIGS. 5 and 6, it is possible to reverse the order of the symbol and words from that shown in FIG. 6 so that the tape can be stopped (by indexing apertures, for example) with the picture just partially within the window, for example, half way. Then, with the picture half hidden, the child makes a selection, and if the selection is correct, the tape moves forward and shows him the full picture of the symbol that matches the word he selected. The tape may stop with the picture in full view, in which case the child would need to depress the correct response button again, or the tape may just continue on until the next picture is half exposed, awaiting another selection by the child.

Instead of hiding half of the picture in the manner just explained, the frame of the tape may move fully under the window with words first and symbol last, and there then may be employed a solenoid-operated covering plate which normally covers about half of the pictured symbol. Then when the child selects the correct word that matches the symbol, the covering plate is pulled back by the solenoid to expose the picture to full view.

While the embodiments of this invention described above and illustrated in the attached drawings will not accomplish the following, those embodiments may easily be modified to prevent the tape from stopping if the operator depresses the correct answer selector while the multiple-choice answers are in the window but have not yet reached their stopping point. For example, this may be done by selecting relays 235 and 236 so that the former is slightly faster than the latter, in which case the correct response relay 234 will open the circuit to the clutch de-energizing relay 236 and prevent it from causing the tape to stop at the indexed point.

It is also possible to create, in the center of the viewing frame or any other place, a brightly illuminated spot into which the words go as they are spoken by the machine. This can be accomplished by simply placing a light bulb, such as bulb 256 shown in FIG. 9, in close proximity with the viewing window.

Further, as an alternative to the transparent arms 138, 140 and 142, shown, for example, in FIG. 10, portions of the viewing windows can be used as antennas, in a manner which is conventional and well known, so that the child need only point at this choice rather than pressing the window. Each of the four corners of the window might be a separate response area and each antenna could be in series with a switch which would then determine whether the choice made was correct.

Thus, it is apparent that this invention has provided for all of the objects and advantages stated. Other objects and advantages, and even further embodiments and modifications of this invention, will become apparent to those of ordinary skill in the art upon reading this disclosure. It is to be understood, however, that the foregoing disclosure and attached drawings are intended to be illustrative and not limitative, the scope of the invention being defined by the following claims.

What is claimed is:

1. In a machine of the class described, in combination:

tape means having thereon a series of frames, a window having an area substantially the size of any one of said frames, means for indexing said tape means to effect full presentation of said frames successively to view through said window, each frame including a first area containing information effectively presenting a question and a plurality of second areas respectively for effectively giving thereto various answers one of which is a desired answer to said question, code means for each frame keyed to indicate the said desired answer, manually operable response means disposed in said window for operative cooperation with the code means of each indexed frame, said response means including a plurality of separate transparent manual selection means respectively over said second areas of an indexed frame for making an election as between the various answers of the instant indexed frame, means coupling the said response means to indexing means for automatically causing the indexing means to operate and index the tape means to its next frame immediately in response to election, after indexing of said frame into full view as aforesaid, of the desired answer by manual operation of the selection means which corresponds to the second area to effectively give the desired answer, and means for preventing said coupling means from automatically causing the index means to operate and index the tape means to its next frame immediately as aforesaid if an answer other than said desired answer is first elected by manual operation of any of the selection means except the selection means which correspond to the second area that effectively gives the desired answer.

2. The combination in claim 1 wherein said first and second areas of an indexed frame are covered by a transparent material sheet disposed in said window, said sheet as it covers the said second areas being divided therebetween and forming the said separate manual selection means.

3. In a machine of the class described, in combination:
tape means having thereon a series of frames,
means for indexing said tape means to effect presentation of said frames successively to view,
each frame including a first area containing information effectively presenting a question and a plurality of second areas respectively for effectively giving thereto various answers one of which is a desired answer for said question,
code means for each frame keyed to indicate the said desired answer,
manually operable response means disposed for operative cooperation with the code means of each indexed frame,
said response means including a plurality of separate manual selection means respectively for said second areas of an indexed frame for making an election as between the various answers of the instant indexed frame,
means coupling the said response means to said indexing means for automatically causing the indexing means to operate and index the tape means to its next frame in response to election of the said desired answer by a manual operation of the selection means which corresponds to the said second area that effectively gives the desired answer,
means coupled to said response means and to said indexing means actuatable, if other than the said desired answer is elected as foresaid, for preventing indexing of said tape means, and
means coupled to said preventing means for releasing said preventing means to allow automatic indexing of said tape means again upon subsequent operation of the said desired answer selection means.

4. The combination in claim 3 wherein said preventing means includes means for power disabling said indexing means, and said releasing means including means for power enabling said indexing means.

5. The combination of claim 3 and further including means for verbally announcing information contained in said first area in each said frame.

6. The combination in claim 5 wherein the verbal announcing means includes a sound track on said tape means fixedly correlated in its movement with said frames and having prerecorded in respective sound track areas said information which is to be announced concerning the instant frame, and means for transducing the informatio from said sound track into a verbal enunciation.

7. In a machine of the class described, in combination:
tape means having thereon a series of frames,
powered means for indexing said tape means to effect presentation of said frames successively to view,
each of said frames having a main item to be identified and at least one corerct identifying item and at least one incorrect identifying item in respective areas with the correct and incorrect identifying items being in different locations in different ones of said frames, said main items being different in different frames,
respective code means for each of said frames disposed on said tape means in correlation with a desired one of said correct and incorrect identifying items of the respective frame,
a plurality of manually operable switch means respectively for said correct and incorrect identifying items per frame,
means for sensing the said code means of each indexed frame,
means coupling the sensing means respectively to said switch means and said switch means to said tape indexing means for causing the tape means to move to its next frame upon operation of the switch means which is associated with the said desired identifying item of the instant frame by being coupled to the sensing means that senses the code means of the instant frame,
resettable means actuatable upon operation of any one of said switch means which is not so associated for disconnecting the power to said powered indexing means to prevent further indexing of said tape means until the actuatable means is reset and then the one of the switch means which is associated with the said desired identifying item of the instant frame is operated as aforesaid, and
means for manually resetting said actuatable means.

8. The combination in claim 7 including transparent material forming a viewing area of size corresponding to one of said frames, said transparent material being flexible and partially subdivided into separated subdivisions respectively corresponding to said identifying items for manual operation of said switch means respectively.

9. The combination in claim 7 and further including record means indexingly correlated to said frames respectively, and means for transducing said record means into a verbal announcement of the respective said main item to be identified.

10. The combination in claim 7 wherein said actuatable means includes a light for lighting an indexed frame except when the main item of that frame is wrongly identified by manual operation of a said switch means which is associated as aforesaid with an undesired identifying item.

11. In a teaching machine of the type using tape means having thereon, at each of a multiplicity of intervals spaced along the length of the type means, a set of visual information containing areas respectively representing effectively one desired answer and at least one other answer to a question effectively presented by information on the tape means which is coded along its length to indicate occurrence of each of said set and to indicate which of the said areas in each set thereof effectively contains the said desired and other answers, the improvement comprising:
means responsive to each said set occurrence indication on said tape means for indexing said tape means to effect presentation of said answer area set successively to view,
manually operable response means disposed for operative cooperation with the said coded answer indications of each indexed set,
said response means including a plurality of separate transparent manual selection means respectively over said areas of an indexed answer set for making an election as between the various answers of the instant indexed set of answers,
means coupling the said response means to said indexing means for automatically causing the indexing means to operate and index the tape means to its next set of answers immediately in response to electing first, after the last prior indexing of the tape means, the said desired answer by a manual operation of the selection means which corresponds to the said area that effectively gives the desired answer, and
means for preventing said coupling means from automatically causing the index means to operate and index the tape means to its next set of answers immediately as aforesaid if an answer other than said desired answer is first elected by manual operation of any of the selection means except the selection means which correspond to the second area that effectively gives the desired answer.

12. The combination in claim 11 wherein said areas of an indexed set of answers are covered by a transparent material which extends beyond the said areas with the material as it covers the said areas being divisible therebetween and forming the said separate manual selection means.

13. In a teaching machine of the type using tape means having thereon, at each of a multiplicity of intervals spaced along the length of the tape means, a set of visual information containing areas respectively representing effectively one desired answer and at least one other answer to a question effectively presented by information on the tape means which is coded along its length to indicate occurrence of each said set and to indicate which of the said areas in each set thereof effectively contains the said desired and other answers, the improvement comprising:

means responsive to each said set occurrence indication on said tape means for indexing said tape means to effect presentation of said answer area sets successively to view, manually operable response means disposed for operative cooperation with the said coded answer indications of each indexed set, said response means including a plurality of separate manual selection means respectively for said areas of an indexed answer set for making an election as between the various answers of the instant indexed set of answers, means coupling the said response means to said indexing means for automatically causing the indexing means to operate and index the tape means to its next answer set in response to election of the said desired answer by a manual operation of the selection means which corresponds to the said area that effectively gives the desired answer, means coupled to said response means and to said indexing means actuatable, if other than the said desired answer is elected as foresaid, for preventing indexing to said tape means, and means coupled to said preventing means for releasing said preventing means to allow automatic indexing of said tape means again upon subsequent operation of the said desired answer selection means.

14. The combination in claim 13 wherein said preventing means includes means for power disabling said indexing means, and said releasing means includes means for power enabling said indexing means.

15. The combination of claim 13 and further including means for verbally announcing information recorded on said tape means.

16. The combination in claim 15 for use with a said tape means which has prerecorded in respective sound track areas the said information which is to be announced and the said combination includes means for transducing the information from said sound track areas into verbal enunciations.

17. In a teaching machine of the type using tape means having thereon, at each of a multiplicity of intervals spaced along the length of the tape means, a set of visual information containing areas respectively representing effectively one desired answer and at least one other answer to a question effectively presented by information on the tape means which is coded along its length to indicate occurrence of each said set and to indicate which of the said areas in each set thereof effectively contains the said desired and other answers, the improvement comprising:

powered means responsive to each said set occurrence indication on said tape means for indexing said tape means to effect presentation of said answer area sets successively to view, a plurality of manually operable switch means respectively for said desired and other answers per set, means for sensing the said coded answer indications of each indexed set of answers, means coupling the sensing means respectively to said switch means and said switch means to said tape indexing means for causing the tape means to move to its next answer set upon operation of the switch means which is associated with the said desired answer of the instant answer set by being coupled to the sensing means that senses the coded answer indications of the instant set, resettable means actuatable upon operation of any one of said switch means which is not so associated for disconnecting the power to said powered indexing means to prevent further indexing of said tape means until the actuatable means is reset and then the one of the switch means which is associated with the said desired answer of the instant set is operated as aforesaid, and means for manually resetting said actuatable means.

18. The combination in claim 17 including transparent material forming a viewing area for each indexed answer set, said transparent material being flexible and at least partially subdivided into separated subdivisions respectively corresponding to said answer areas for manual operation of said switch means respectively.

19. The combination in claim 17 for use with a said tape means which includes record means indexingly correlated to the question and answer information on said tape means, and said combination includes means for transducing said record means into a verbal announcement concerning at least part of said information.

20. The combination in claim 17 wherein said actuatable means includes a light for lighting an indexed frame except when the main item of that frace is wrongly identified by manual operation of a said switch means which is associated as aforesaid with an undesired identifying item.

21. In a teaching machine of the type using tape means having thereon, at each of a multiplicity of intervals spaced along the length of the tape means, a set of visual information containing areas respectively representing effectively one desired answer and at least one other answer to a question effectively presented by information on the tape means which is coded along its length to indicate occurrence of each said set and to indicate which of the said areas in each set thereof effectively contains the said desired and other answers, the improvement comprising:

means forming a window, means for moving said tape means longitudinally forward past said window to effect a viewing presentation of the said information on the tape means, means responsive to the said set occurrence indication on said tape means for stopping said movement of said tape means with the respective set of areas indexed to view through said window, a plurality of separate manually operable selection means respectively disposed adjacent said window means and corresponding in number to the maximum number of said areas in any one of said sets of information containing areas on the tape means for selecting any one of the answers in an indexed set thereof, means coupling the said response means to at least one of said moving and stopping means and operative in accordance with the instant set of said coded answer indications on the tape means and which of said selection means is manually operated, for automatically restarting longitudinal forward movement of said tape means immediately if the said desired answer is elected first after an answer set comes into said window, by a manual operation of the said selection means which corresponds to the said tape area that effectively gives the desired answer, and means for preventing said coupling means from automatically restarting said forward movement immediately as aforesaid if an answer other than said desired answer is first elected by manual operation of any of the selection means except the selection means which correspond to the tape area that effectively gives the desired answer.

22. A machine as in claim 21 including
releasable means responsive to operation of a said selection means corresponding to said other answer for positively preventing said automatic restarting movement of said tape means, even if the desired answer selection means is operated, before the releasable preventing means is released, and
means for releasing said releasable preventing means so that said tape means can be automatically restarted again if the desired answer selection means is operated.

23. A machine as in claim 22 wherein said releasing means includes manually depressible push-button means requiring a predetermined amount of depressing pressure on it to effect the said release of said preventing means.

24. A machine as in claim 22 wherein said releasing means includes actuatable delay means operable after the elapse of a given amount of time starting from actuation to effect the said release of said preventing means, and means for actuating said delay means.

25. A machine as in claim 24 wherein said actuating means includes manually depressible push-button means said tape means in the reverse direction during said given time and for returning control of tape movement back to said forward moving means after the said release of said preventing means whereby the tape means may automatically move forward again until stopped again by said stopping means.

26. A machine as in claim 21 including an audio recording on said tape means of information representing and adjacent each of said desired answers, and audio playback means for announcing said desired answer audio information during relative movement of said tape and playback means.

27. A machine as in claim 21 including said tape means wherein the question and answer information is in the form of word phrases extending lengthwise of the tape means with at least some of the phrases including one word which is the said desired answer in a given one of said sets of answers, said tape means including in each said answer set at least another word which is said other answer and which is disposed adjacent the said one word of the set but makes less sense in the phrase in question than the said one word thereof.

28. A machine as in claim 21 including means for preventing said restarting movement of said tape means if a plurality of said selection means are concurrently operated.

29. A machine as in claim 21 including seat means for a machine operator, and means, including master switch means on said seat means operable in response to the sitting of said operator on said seat means, for turning said machine on and off.

30. A machine as in claim 29 wherein said master switch means has a delay characteristic in turning said machine off.

31. A machine as in claim 21 wherein said automatic restarting means includes voice recognition means and means for preventing said forward restarting movement unless and until there is effective concurrence between the operation of said desired answer selection means and the operation of said voice recognition means in response to the voice of the machine operator.

32. A machine as in claim 21 and further including voice recognition means responsive to the voice of a machine operator for alternately causing said tape means to restart forward movement automatically.

33. A machine as in claim 21 wherein each said frame has associated therewith indicia indicating the number of frames to be repeated upon an incorrect response, and including means for moving said tape means longitudinally backwards past said window to cause at least a single frame to be presented again and means for causing said backward moving means to move said tape means automatically if the answer selected by a manual operation of the said selection means corresponds to a tape area other than the tape area that effectively gives the desired answer and means responsive to said indicia for stopping the movement of said tape means after said number of frames have been passed.

34. A machine as in claim 33 including means for causing said backward moving means to move said tape backward for any given number of frames and means for manually choosing said given number.

35. A machine as in claim 21 including at least a single source of light disposed so as to illuminate at least a portion of said window and means for causing said source of light to illuminate said portion in response to election of the desired answer by a manual operation of the said selection means which corresponds to the tape area that effectively gives the desired answer.

36. A machine as in claim 35 including means for causing said source of light to cease illuminating said portion a short time after said forward movement of said tape begins.

37. A machine as in claim 36 including a second source of light disposed so as to illuminate at least a portion of said window and means for causing said second source of light to cease illuminating said portion in response to election of any answer, except said desired answer, by a manual operation of the said selection means which corresponds to the tape area other than the tape area that effectively gives said desired answer.

38. A machine as in claim 21 wherein said set occurrence indication is an aperture through said tape and said responsive means includes an electrically conductive roller with said tape means partially disposed about it, a source of electrical energy, a first contact electrically connecting said roller to one side of said source, a second contact pushing against said tape so that the movement of said aperture to a position under said second contact causes said second contact to be electrically connected to said one side at said source and electrically actuatable means connected between said second contact and the other side of said source to cause said tape means to stop when said second contact is electrically connected to said roller through said aperture.

39. A machine as in claim 38 wherein said information indicating which area in each set effectively contains the said desired answer is a second aperture in a given position and wherein said restarting means includes an electrical contact associated with each manual selection means and disposed with said tape means between said roller and said electrical contact so that when the desired answer is elected by a manual operation of the said selection means, one of said contacts is pressed into electrical connection with said roller through said second aperture, and electrically actuatable means connected to said contact to cause said moving means to move said tape means forward past said window.

40. A machine as in claim 21 wherein said set occurrence indication is an area of electrically conductive material on said tape and wherein said responsive means includes a pair of contacts electrically connected together by said area and including electrically actuatable means connected to one of said contacts so that the movement of said area to a position connecting said contacts causes said tape means to stop moving said tape.

41. A machine as in claim 40 wherein said information indicating which area in each set effectively contains the said desired answer is a second area of electrically conductive material in a given position and wherein said restarting means includes an electrical switch associated with each manual selection means, electrically actuatable means associated with each manual selection means so that the actuatable means, associated with the manual selection means which corresponds to the tape area that effectively gives the desired answer, is actuated by said second area of material when said tape is stopped and causes said moving means to move said tape forward when said switch associated with the manual selection means which corresponds to area that effectively gives the desired answer is operated manually.

42. A machine as in claim 21 including a casing containing said responsive means, said moving means and said restarting means and at least a single envelope, mounted on said casing and having an open end for receiving and holding a card with information displayed thereupon and a transparent face for displaying said information.

43. A machine as in claim 21 wherein said tape means includes a hook attached to the beginning of the tape and a spool upon which said tape is rolled and wherein said moving means includes means for engaging said hook to pull said tape past said window.

44. A teaching machine as in claim 21 wherein said window contains a transparent sheet of material which includes separate switch actuators as part of the said separate manually operable selection means respectively, said transparent switch actuators respectively superposing the said answer areas in any set thereof which is indexed to view through said window as aforesaid.

45. A teaching machine as in claim 44 wherein said transparent switch actuators are arranged transversely of longitudinal movement of said tape means and are disposed in said window adjacent the forward downstream edge of the window so that substantially all of the tape information preceding any indexed set of answer areas is substantially concealed.

46. A teaching machine as in claim 21 wherein said automatic restarting means includes means for preventing restarting said forward movement by first electing and operating another answer selection means even if the desired answer selection means is operated as the first act by the operator following his operation of said another answer selection means.

47. A teaching machine as in claim 21 including means for preventing the stopping of said tape means if the said desired answer selection means is operated after any given set of answer areas is at least partially in said window but before said stopping means has been signaled by the corresponding said set occurrence indication to stop the tape means.

48. A teaching machine as in claim 21 including the said tape means and means for causing the said stopping means to stop the tape means with at least partial concealment of information concerning the effective question answerable by one of the answers in the set of answer areas instantly in the said window.

49. A teaching machine as in claim 21 including delay means for causing said automatic restarting means to move the tape means forward upon operation of the desired answer selection means following the elapse of at least a predetermined amount of time after another answer selection means was first erroneously elected and operated instead of the desired answer selection means.

50. A teaching machine as in claim 49 including:
manually operable means for rewinding said tape means, and
means coupling said rewinding and delay means for causing said predetermined amount of time to start elapsing with operation of said rewinding means.

51. A machine as in claim 21 in combination with said tape means which contains as said question and answer information a series of words some of which are visible with a first characteristic and others with a second characteristic, said other words being respectively in said answer sets,
said tape means further including audio recordings of only, and synchronized with, the said words with said first characteristic,
said machine including audio playback means adjacent said recordings for announcing only the words with said first characteristic.

52. In a teaching machine, the improvement comprising:
tape means containing a series of visible words,
means for moving said tape means forward so that said visible words successively come into view to a machine operator,
audio record means synchronized for movement with said tape means and containing recordings of said words except at least predetermined spaced ones thereof,
means for playing back said audio recordings,
means for stopping movement of said tape means after each one of said predetermined words comes into view, and
means responsive to recognition by said operator of the instant predetermined word in view for automatically restarting forward movement of said tape means, 53. A machine as in claim 52 wherein said movement restarting means includes voice recognition means.

54. A machine as in claim 52 wherein said movement restarting means includes manually operated multiple choice word selection means.

55. A machine for use with a tape having a plurality of frames and a plurality of code means each associated with a respective frame, with each of said code means having a preselected code portion occupying, in different frames, a different one of a plurality of predetermined spaced-apart positions uniformly located adjacent each of the frames; said machine comprising:
means normally operable for indexing said tape to display successive frames thereof;
first means actuatable to operate said indexing means;
second means actuatable to render said indexing means inoperative;
a plurality of spaced-apart sensing means each disposed for sensing, on the displayed frame, a respective one of said spaced-apart positions;
a plurality of manually operable selection means each associated with a respective one of said sensing means;
means cooperative to actuate said first actuatable means in response to manual operation of the selection means associated with the sensing means disposed for sensing the position on the displayed frame occupied by said preselected code portion;
and means cooperative to actuate said second actuatable means in response to manual operation of a selection means associated with a sensing means disposed for sensing a position on the displayed frame other than that occupied by said preselected code portion.

56. A machine as recited in claim 55 and comprising: manually operable means for resetting said second actuatable means to a deactuated condition and thereby rendering said indexing means operative.

57. A machine as recited in claim 55 wherein each of said selection means comprises:
a manually flexible transparent member separate and discrete from each transparent member of the other selection means;
each transparent member having a location overlying an area thereunder to be occupied by a respective portion of an indexed frame of a tape used with said machine.

58. Tape means for use with a teaching machine having means normally operable for indexing tape means through the machine, first means actuatable to operate said indexing means, second means actuatable to render said indexing means inoperative, a plurality of spaced-apart position sensing means, and a plurality of manually operable selection means each associated with a respective one of said sensing means; said tape means comprising:
a plurality of frames;
a plurality of code means each associated with a respective frame;

each of said code means having a preselected code portion occupying, in different frames, a different one of a plurality of predetermined spaced-apart positions uniformly located relative to each of said frames;

the spacing between said predetermined positions for a frame corresponding to the spacing of said sensing means on the machine with which the tape is to be used;

said preselected code portion including means cooperative to actuate said first actuatable means on the machine in response to manual operation of the selection means associated with the sensing means disposed for sensing the position on a displayed frame occupied by said preselected code portion;

said code means including means cooperative to actuate said second actuatable means on the machine in response to manual operation of a selection means associated with a sensing means disposed for sensing a position on a displayed frame other than that occupied by said preselected code portion.

59. Tape means as recited in claim 58 and comprising a sound track thereon associated with said frames.

60. The method of teaching a pupil comprising:

moving forward through a window area in front of the pupil a strip of material containing a series of visible words so that the words come successively into said window area for viewing by the pupil;

stopping movement of the strip only when each one of predetermined spaced words comes into said window area as aforesaid;

announcing each of said visible words as they come into view, except for said predetermined words; and moving said strip forward again each time after indication by the pupil of the instant predetermined word in said window area.

61. Tape means for use with a teaching machine having means normally operable for moving the tape means through the machine, first means actuatable to operate said moving means, second means actuatable to render said moving means inoperative, a pluarlity of spaced-apart position sensing means, and a plurality of manually operable selection means each associated with a respective one of said sensing means; said tape means comprising:

a strip of material containing visual information and a plurality of visually spaced multiple choice answer sets relating thereto;

a plurality of code means respectively associated with said answer sets;

each of said code means having a preselected code portion occupying, for different answer sets, a different one of a pluarlity of predetermined spaced-apart positions uniformly located relative to each said answer set;

the spacing between said predetermined positions for each answer set corresponding to the spacing of said sensing means on said machine;

said preselected code portion including means cooperative to actuate said first actuatable means on the machine in response to manual operation of the selection means associated with the sensing means disposed for sensing the position relative to a displayed answer set occupied by said preselected code portion;

said code means including means cooperative to actuate said second actuatable means on the machine in response to manual operation of a selection means associated with a sensing means disposed for sensing a position related to a displayed answer set other than that occupied by said preselected code portion.

62. In a machine for teaching a young child and of the type using an information carrier containing a multiplicity of multiple choice answer sets disposed along the carrier for answering questions at least effectively posed by information otherwise on the carrier, the improvement comprising:

seat means for said child;

an upstanding housing containing a window for displaying a portion of said information to said child when seated on said seat means;

means for continually moving said carrier forward past said window for viewing by the child of each said effective question and the associated set of said multiple choice answers, including means operative by said child to select correct answers;

means operative by said child to select incorrect answers; and seat operated means for enabling and disabling said moving means in response respectively to said child sitting and not sitting on said seat means.

63. A teaching machine as in claim 62 including:

means operative in response to the selection by said child of an incorrect answer for at least temporarily disabling said moving means, means subordinate to said seat operated enabling means for re-enabling said moving means after same has been disabled by the selection of an incorrect answer, and means for at least temporarily preventing said seat operated disabling and enabling means from operating before said re-enabling means operates if said child stops sitting on said seat means after the incorrect answer disabling means disables said moving means.

64. The method of teaching a child to read comprising:

presenting to the child on a continuous strip of material a series of visible words forming a multiplicity of sentences extending in the lengthwise direction of said strip with at least a plurality of said sentences having at least one multiple choice word set containing correct and incorrect words of which only the correct word makes sense in the sentence in question but is differently positioned in different ones of said set, said presenting being effected by moving said strip forward in its lengthwise direction through a window area in front of the child so that the words of each sentence come successively into said window area and said multiple choice word sets are presented in said window area successively, poking, by the child, at one of the words in a multiple choice word set instantly in said window area, and immediately moving the strip and that multiple choice word set forwardly out of the window area but only if the said child first pokes at the said correct word in that multiple choice word set instantly in the window area.

65. The method of claim 64 including stopping said forward strip movement each time a said multiple choice word set is in full view in said window area, and then immediately moving the strip as aforesaid.

66. A teaching machine comprising:

tape means having thereupon a series of frames each said frame having associated therewith indicia indicating the number of frames to be repeated upon an incorrect response, a window having an area substantially the size of one of said frames, means for indexing said tape means to effect presentation of said frames successively to view through said window, said frame including a first area containing information for effectively presenting a question and a second area for effectively presenting a choice of answers to the question, one of said answers being the desired answer.

manually operable response means for manually choosing any one of the answers presented, first means associated with said manually operable response means for automatically causing the indexing means to operate and to index the tape means to the next frame in response to election of the desired answer by manual operation of the response means, second means associated with said manually operable response means for automatically causing the tape means to move in a direction opposite the direction said tape means is moved by said indexing means in response to election of an answer other than said desired answer by manual operation of said response means, and means responsive to said indicia for stopping the movement of said tape means after said number of frames have been passed.

67. A teaching machine as in claim 66 including magnetic tape means containing information in at least two separate tracks and means for reading one of said tracks to produce audio information, and means for causing said reading means to read a first of said tracks in response to election of the desired answer by manual operation of said response means and for causing said reading means to read the second of said tracks in response to election of an answer other than said desired answer.

68. A teaching machine as in claim 66 including code means for each frame keyed to indicate said desired answer and wherein said response means includes a plurality of separate transparent manual selection means respectively over said second areas of an indexed frame for making an election as between the various answers of the indexed frame.

69. In a teaching machine of the type using tape means having thereon, at each of a multiplicity of intervals spaced along the length of the tape means, a set of visual information containing areas respectively representing effectively one desired answer and at least one other answer to a question effectively presented by information on the tape means which is coded along its length to indicate occurrence of each said set and to indicate which of the said areas in each set thereof effectively contains the said desired and other answers, the improvement comprising:

means forming a window, means for moving said tape means longitudinally forward past said window to effect a viewing presentation of the said information on the tape means, means responsive to the said set occurrence indication on said tape means for stopping said movement of said tape means with the respective set of areas indexed to view through said window, a plurality of separate manually operable selection means respectively disposed adjacent said window means and corresponding in number to the maximum number of said areas in any one of said sets of information containing areas on the tape means for selecting any one of the answers in an indexed set thereof, means coupling the said selecting means to at least one of said moving and stopping means and operative in accordance with the instant set of said coded answer indications on the tape means and which of said selection means is manually operated, for automatically restarting longitudinal forward movement of said tape means only if the said desired answer is elected first after an answer set comes into said window, by a manual operation of the said selection means which corresponds to the said tape area that effectively gives the desired answer, and means for causing said coupling means to delay for a reward time period restarting said longitudinal forward movement after operation of the said selection means corresponding to the tape area that effectively give the desired answers.

70. An improvement as in claim 69 further comprising lamp means connected to said causing means so that said lamp means is lit during said reward period.

71. An improvement as in claim 69 further including manual operable means for moving said tape in a reverse longitudinal direction and means for preventing said coupling means from restarting longitudinal forward movement in response to a manual operation of said selection means corresponding to the tape area that effectively gives the desired answer after a manual operation of a selection means corresponding to the tape area that effectively gives an answer other than said desired answer so that said student must operate said reverse moving means after operation of said selection means corresponding to the tape area that effectively gives an answer other than said desired answer.

72. A improvement as in claim 69 wherein said coded answer indications are electrically conducting regions.

73. An improvement as in claim 69 further including voice recognition means, means for preventing said forward restarting movement unless and until there is effective concurrence between operation of said desired answer selection means and the operation of said voice recognition means in response to the voice of the machine operator and means responsive to coded indicia on said tape for activating said preventing means.

74. In a machine of the class described, in combination:

means having thereon a series of information regions, each including at least a single question and a plurality of answers to that question, at least one of which is the desired answer, means for presenting, one at a time, each of said regions successively for viewing, manually operable response means including a plurality of separate manually operable selection means, each associated with one of said plurality of answers to that selection of one of said selection means indicates selection of the associated answer, code means for indicating the desired answer for each said region, means coupling the said response means to said presenting means for automatically causing the presenting means to operate and present the next region immediately in response to election, after presentation of a region in full view as aforesaid, of the desired answer by manual operation of the selection means associated with the desired answer, and means for preventing said coupling means from automatically causing the presenting means to operate and present the next region immediately as aforesaid if an answer other than said desired answer is first elected by manual operation of any of the selection means except the selection means associated with the desired answer.

75. A teaching machine comprising:

tape means having thereupon a series of frames each said frame having associated therewith indicia indicating the number of frames to be repeated upon an incorrect response, a window having an area substantially the size of one of said frames, means for indexing said tape means to effect presentation of said frames successively to view through said window, said frame including a first area containing information for effectively presenting a question and a second area for effectively presenting a choice of answers to the question, one of said answers being the desired answer, manually operable response means for manually choosing any one of the answers presented, first means associated with said manually operable response means for automatically causing the indexing means to operate and to index the tape means to the next frame in response to election of the desired answer by manual operation of the response means, manually operable means for causing the tape means to move in a direction opposite the direction said tape means is moved by said indexing means so as to repeat at least a single frame, and means for preventing said first means from causing said indexing means from indexing said tape means to said next frame in response to election of an answer other than said desired answer by manual operation of said response means so that said tape means remains stationary until said manual operable causing means is manually operated.

References Cited
UNITED STATES PATENTS

| | | | |
|---|---|---|---|
| 2,877,568 | 3/1959 | Besnard et al. | 35—9 |
| 3,141,243 | 7/1964 | Chapman et al. | 35—9 |
| 3,212,199 | 10/1965 | Clark | 35—9 |
| 3,408,749 | 11/1968 | Brudner | 35—9 |

WILLIAM H. GRIEB, Primary Examiner